United States Patent

Nitta et al.

[11] Patent Number: 6,106,963
[45] Date of Patent: Aug. 22, 2000

[54] FUEL-CELLS SYSTEM

[75] Inventors: Shoichiro Nitta, Aichi-ken; Masayoshi Taki, Konan; Tatsuya Kawahara, Toyota; Morimichi Miura, Gamagouri, all of Japan

[73] Assignee: Toyota Jidosha Kabushiki Kaisha, Toyota, Japan

[21] Appl. No.: 09/072,667

[22] Filed: May 5, 1998

[30] Foreign Application Priority Data

May 15, 1997 [JP] Japan .................................. 9-141059

[51] Int. Cl.[7] .............................. H01M 8/18; H01M 2/00; H01M 8/04
[52] U.S. Cl. .................................. 429/19; 429/10; 429/26
[58] Field of Search .................. 429/10, 19, 26

[56] References Cited

U.S. PATENT DOCUMENTS

| | | | |
|---|---|---|---|
| 3,493,436 | 2/1970 | Johnsen | 136/86 |
| 3,847,670 | 11/1974 | Johnsen | 136/86 R |
| 3,972,731 | 8/1976 | Bloomfield et al. | 136/86 R |
| 5,175,061 | 12/1992 | Hilderbrandt et al. | 429/16 |

FOREIGN PATENT DOCUMENTS

| | | |
|---|---|---|
| 0 729 196 | 8/1996 | European Pat. Off. . |
| 0 773 188 | 5/1997 | European Pat. Off. . |
| 63-10473 | 1/1988 | Japan . |
| 2-51870 | 2/1990 | Japan . |
| 3-276576 | 12/1991 | Japan . |
| 3-284344 | 12/1991 | Japan . |
| 4-190570 | 7/1992 | Japan . |
| 6-140067 | 5/1994 | Japan . |

OTHER PUBLICATIONS

An explanatory pamphlet of Vortex Cooler, pp. 1–8, Japan (with English Abstract) no date available.

*Primary Examiner*—Edna Wong
*Attorney, Agent, or Firm*—Oblon, Spivak, McClelland, Maier & Neustadt, P.C.

[57] ABSTRACT

A fuel-cells system 20 is equipped with an oxygen enrichment unit 34 and supplies air whose oxygen partial pressure has been increased by the oxygen enrichment unit 34 to fuel cells 40 as oxidizing gas. The oxygen enrichment unit 34 is a magnetic oxygen enrichment device that effects oxygen enrichment utilizing the fact that the oxygen molecule is paramagnetic and when magnetized migrates toward a magnetic pole side. Specifically, a magnetic field is generated inside the oxygen enrichment unit 34 by an electromagnet, air compressed by a compressor unit 32 is supplied to the oxygen enrichment unit 34, and compressed oxygen-enriched air is discharged from the vicinity of the magnetic poles in the oxygen enrichment unit 34 and supplied to the fuel cells 40.

8 Claims, 15 Drawing Sheets

FUEL-CELLS SYSTEM

BACKGROUND OF THE INVENTION

1. Field of the Invention

The present invention relates a fuel-cells system, particularly to a fuel-cells system comprising a fuel cell which receives a supply of gaseous fuel and a supply of oxidizing gas, and generates an electromotive force.

2. Description of the Prior Art

Regarding a fuel cell that produces electromotive force by electrochemical reactions when supplied on the anode side with a gaseous fuel containing at least hydrogen and on the cathode side with an oxidizing gas containing at least oxygen, it is well known from Nernst's equation set out below that increasing the hydrogen partial pressure of the gaseous fuel or the oxygen partial pressure of the oxidizing gas elevates the electromotive force $E^T$ of the cell and also improves the power generating efficiency.

$$E^T = E^O + (RT \cdot ln(P_{H2} \cdot P_{O2}^{1/2}/P_{H2O}))/2F \quad (1)$$

$E^T$: Open voltage
$E^O$: Theoretical voltage calculated from free energy
F: Faraday constant
R: Gas constant
T: Temperature
$P_{H2}$: Hydrogen partial pressure
$P_{O2}$: Oxygen partial pressure
$P_{H2O}$: Water partial pressure In the oxidizing gas supplied to the anode side, the oxygen partial pressure of the oxidizing gas is related to the oxygen concentration and the supplied gas total pressure as follows:

$$P_{O2} = P \cdot X_{O2}/100 \quad (2)$$

$P_{O2}$: Oxygen partial pressure of oxidizing gas supplied to cathode side
$X_{O2}$: Oxygen concentration of the oxidizing gas supplied to the cathode side
P: Total pressure of oxidizing gas supplied to cathode side It follows from Equation (2) that the oxygen partial pressure of the oxidizing gas can be increased by increasing the total pressure of the oxidizing gas. A widely adopted conventional practice has therefore been to incorporate a compressor into the fuel-cells system and to supply the fuel cells with air compressed by the compressor as oxidizing gas. The aim of this practice is to raise the total pressure of the air (i.e., the oxidizing gas) so as to increase the oxygen partial pressure of the oxidizing gas and thus increase the electromotive force of the fuel cells. It also follows from Equation (2) that higher oxygen partial pressure of the oxidizing gas can also be achieved by raising the oxygen concentration of the supplied oxidizing gas, meaning that power generating performance of the fuel cells can be further enhanced by increasing the oxygen concentration.

Methods proposed for raising the oxygen concentration of the oxidizing gas supplied to a fuel cell include that of supplying the fuel cell with an oxidizing gas obtained by removing nitrogen from air by use of a nitrogen separator installed in the fuel-cells apparatus, as taught by Japanese Patent Laid-open Gazette No. 6-140067, for example. Specific methods known for supplying a fuel cell with oxygen-enriched air obtained by separating nitrogen from air include the method of supplying a fuel cell with an oxidizing gas obtained by enriching the oxygen content of air by the PSA (Pressure Swing Absorption) method (taught, for example, by Japanese Patent Laid-open Gazette No. 4-190570) and the method of supplying a fuel cell with oxygen selectively separated from air by use of an oxygen permeable membrane (taught, for example, by Japanese Patent Laid-open Gazette No. 3-276576). By use of these methods, the oxygen concentration of the oxidizing gas supplied to the fuel cell can be increased to enhance the power generating performance of the fuel cell.

The PSA method consists in passing air removed of water vapor and carbon dioxide through a molecular sieve made of zeolite or the like to cause mainly nitrogen to be adsorbed by the zeolite and thereby obtain an oxidizing gas of high oxygen partial pressure. The PSA method can provide an oxidizing gas having very high oxygen partial pressure (oxygen concentration of 90% or more). The PSA method also has disadvantages, however. One is that the large amount of zeolite or other adsorbent needed increases the size of the apparatus. Another is that a large amount of electric power is needed to drive the device for effecting the method. These drawbacks make the PSA method difficult to apply particularly in the case where the fuel cells of a fuel-cells system installed in an electric vehicle are used as a power source for driving the vehicle.

In the method of separating oxygen from air by use of an oxygen permeable membrane, the permeable membrane constantly receives a pressure falling within a prescribed range during oxygen separation. The low durability of the permeable membrane therefore makes the device for effecting this method incapable of stable oxygen separation over a long period. To secure an adequate oxidizing gas flow by this method, moreover, the amount of air processed has to be increased by using a large area permeable membrane and/or making the pressure differential between the opposite sides of the permeable membrane great. However, the size of the overall device increases in proportion to the area of the membrane and energy consumption rises in proportion to the pressure differential. The method using an oxygen permeable membrane is therefore difficult to adopt for supply of oxidizing gas to fuel cells for powering an electric vehicle.

SUMMARY OF THE INVENTION

The object of this invention is to provide a fuel-cells system equipped with an oxygen enrichment device wherein fuel cell power generating efficiency is enhanced by increasing the oxygen concentration of the oxidizing gas by a very compact and highly durable oxygen enrichment device.

This invention provides a fuel-cells system comprising a fuel cell which receives a supply of gaseous fuel containing at least hydrogen and a supply of oxidizing gas containing oxygen and generates an electromotive force through an electrochemical reaction of the gaseous fuel and the oxidizing gas, the fuel-cells system comprising an oxidizing gas supply device for feeding the supply of oxidizing gas to the fuel cell, the oxidizing gas supply device comprising:
a magnetic field generating unit which generates a magnetic field in a space between magnetic poles,
a gaseous mixture supply unit which feeds a supply of gaseous mixture containing at least oxygen to the space where the magnetic field is generated by the magnetic field generating unit, and
a high oxygen-concentration gas production unit which takes a high oxygen-concentration gas from the vicinity of the magnetic poles and feeds the high oxygen-concentration gas to the fuel cell as the supply of oxidizing gas.

The fuel-cells system of the foregoing configuration can supply the fuel cell(s) with an oxidizing gas that is a high oxygen concentration gas containing many oxygen molecules. This is because the oxygen molecules, which exhibit the highest magnetic susceptibility among the molecules composing the mixed gas in the magnetic field, selectively migrate through the magnetic field to near the magnetic poles. The fuel-cells system can therefore boost the electromotive force of the fuel cells to achieve higher power generating efficiency. If air is used as the mixed gas containing at least oxygen, the mixed gas can be easily taken in and stably supplied to the magnetic oxygen enrichment device. Moreover, since the device used to raise the oxygen concentration of the oxidizing gas is a device that separates oxygen molecules utilizing magnetic susceptibility differential in a magnetic field, i.e., a magnetic oxygen enrichment device, the oxygen concentration of the oxidizing gas can be increased using a highly compact device. Either an electromagnet or a permanent magnet can be used as the means which generates the magnetic field in the magnetic oxygen enrichment device.

In the fuel-cells system of this invention, the oxidizing gas supply device can further comprise an oxidizing gas compressing unit which pressurizes the oxidizing gas fed to the fuel cells.

In this configuration, the oxidizing gas supplied to the fuel cells is increased in oxygen concentration by utilizing magnetic susceptibility differential in a magnetic field and is additionally compressed in the oxidizing gas compressing unit. The oxygen partial pressure of the oxidizing gas is therefore further increased to additionally heighten the effect of enhancing the power generating efficiency of the fuel cells by boosting their electromotive force. The compression by the oxidizing gas compressing unit can be effected either before or after the oxygen enrichment by the magnetic oxygen enrichment device, which is to say it suffices so long as the oxidizing gas finally supplied to the fuel cells is compressed.

In the fuel-cells system of this configuration, the oxidizing gas compressing unit can comprise a compressor that compresses the gaseous mixture or the high oxygen-concentration gas and is operated by a turbine driven by a high-pressure gas discharged from a constituent of the fuel-cells system. Since the compressor that compresses the oxidizing gas is driven by high-pressure gas discharged from a constituent of the fuel-cells system in this configuration, no specially supplied energy is needed for compressing the oxidizing gas. The compression of the oxidizing gas can therefore be effected without lowering the energy efficiency of the overall system.

The fuel-cells system of this configuration can be constituted so that
    the magnetic field generating unit generates a magnetic field in a space of the compressor,
    the gaseous mixture supply unit supplies the gaseous mixture to the space where the magnetic field is generated in the compressor, and
    the high oxygen-concentration gas production unit feeds the compressed high oxygen-concentration gas, which is taken out of the compressor, to the fuel cell as the supply of oxidizing gas.

In this configuration, since a magnetic oxygen enrichment device is formed inside and integrally with the compressor, the oxidizing gas supplied to the fuel cells can be simultaneously subjected to oxygen enrichment and compression and the structure of the fuel-cells system can be simplified. Moreover, the incorporation of the magnetic oxygen enrichment device inside the compressor driven by high-pressure gas discharged from a constituent of the fuel-cells system reduces the amount of extra energy needed to drive the magnetic oxygen enrichment device.

The fuel-cells system of this configuration can be constituted so that
    the compressor is driven to compress the gas therein by power transmitted thereto by a shaft connected to the turbine,
    the magnetic poles are disposed on an axis of rotation about which the compressor rotates,
    the space of the compressor, which receives the gaseous mixture, has a cross-sectional area perpendicular to the axis of rotation that is smaller at a region near at least one of the magnetic poles than at other regions, and
    the high oxygen-concentration gas production unit takes the compressed high oxygen-concentration gas from the region near the magnetic pole having the small cross-sectional area.

In the fuel-cells system of this configuration, the region near one or both magnetic poles to which the oxygen molecules migrate owing to their high magnetic susceptibility in the magnetic field is formed to be narrower than other regions. The effect of heightening the oxygen concentration near the magnetic pole(s) is therefore enhanced to enable supply of oxidizing gas of higher oxygen partial pressure to the fuel cells.

The fuel-cells system of this invention can be configured so that
    the oxidizing gas compressing unit comprises a plurality of compressors that operate in sequence to compress the gaseous mixture or the high oxygen-concentration gas and are actuated by separate turbines driven by high-pressure gases discharged from separate constituents of the fuel-cells system, and
    the plurality of compressors are driven in an ascending order of energy possessed by the high-pressure gases to sequentially compress the gaseous mixture or the high oxygen-concentration gas.

Since the oxidizing gas is compressed by multiple compressors in the fuel-cells system of this configuration, the oxygen partial pressure of the oxidizing gas supplied to the fuel cells is further increased to enhance the effect of boosting the electromotive force of the fuel cells. Moreover, since the multiple compressors compress the gaseous mixture or the high oxygen-concentration gas sequentially starting from the one driven by the high-pressure gas having the least energy, the efficiency of oxidizing gas compression is improved and the energy discharged by the constituent of the fuel-cells system can be utilized without waste. In the fuel-cells system of this configuration, each of the compressors can have one of the magnetic oxygen enrichment devices incorporated therein. By also providing multiple magnetic oxygen enrichment devices, an improvement in oxygen enrichment efficiency can be obtained on top of the improvement in oxidizing gas compression efficiency. A still further increase in the oxygen partial pressure of the oxidizing gas supplied to the fuel cells can therefore be realized.

In the fuel-cells system of this invention, the oxidizing gas supply device can be further installed with a gaseous mixture cooling unit which cools down the gaseous mixture supplied to the space where the magnetic field is generated.

In the fuel-cells system of this configuration, since the magnetic susceptibility of the oxygen molecules in the gaseous mixture supplied to the magnetic oxygen enrichment device is increased by cooling down the gaseous mixture, the oxygen enrichment efficiency in the magnetic oxygen enrichment device is further enhanced to raise the oxygen partial pressure of oxidizing gas supplied to the fuel cells. The electromotive force of the fuel cells therefore rises.

Other configurations of the invention are also possible. A specific example of another configuration is an electric vehicle driven by a motor supplied with electric power from a prescribed power source, the electric vehicle comprising:

a fuel-cells system of the invention installed therein, at least a part of the electric power required by the motor being supplied by fuel cells provided in the fuel-cells system.

In the electric vehicle of this configuration, since the fuel cells that supply electric power to the motor for driving the vehicle are supplied with oxidizing gas enriched in oxygen by utilizing the high magnetic susceptibility of oxygen molecules in a magnetic field, the electrochemical reactions in the fuel cells are promoted to improve their power generating efficiency. Therefore, in addition to the advantageous effects of the fuel-cells system of the invention described in the foregoing, it is further possible to secure a greater degree of freedom in the designing of an electric vehicle owing to the fact that the improved power generating efficiency of the fuel cells enables the overall size of the fuel-cells system to be reduced.

BRIEF DESCRIPTION OF THE DRAWINGS

FIG. 6 is a sectional view illustrating the structure of an oxygen enrichment unit 34a;

DESCRIPTION OF THE PREFERRED EMBODIMENTS

Figure 1:
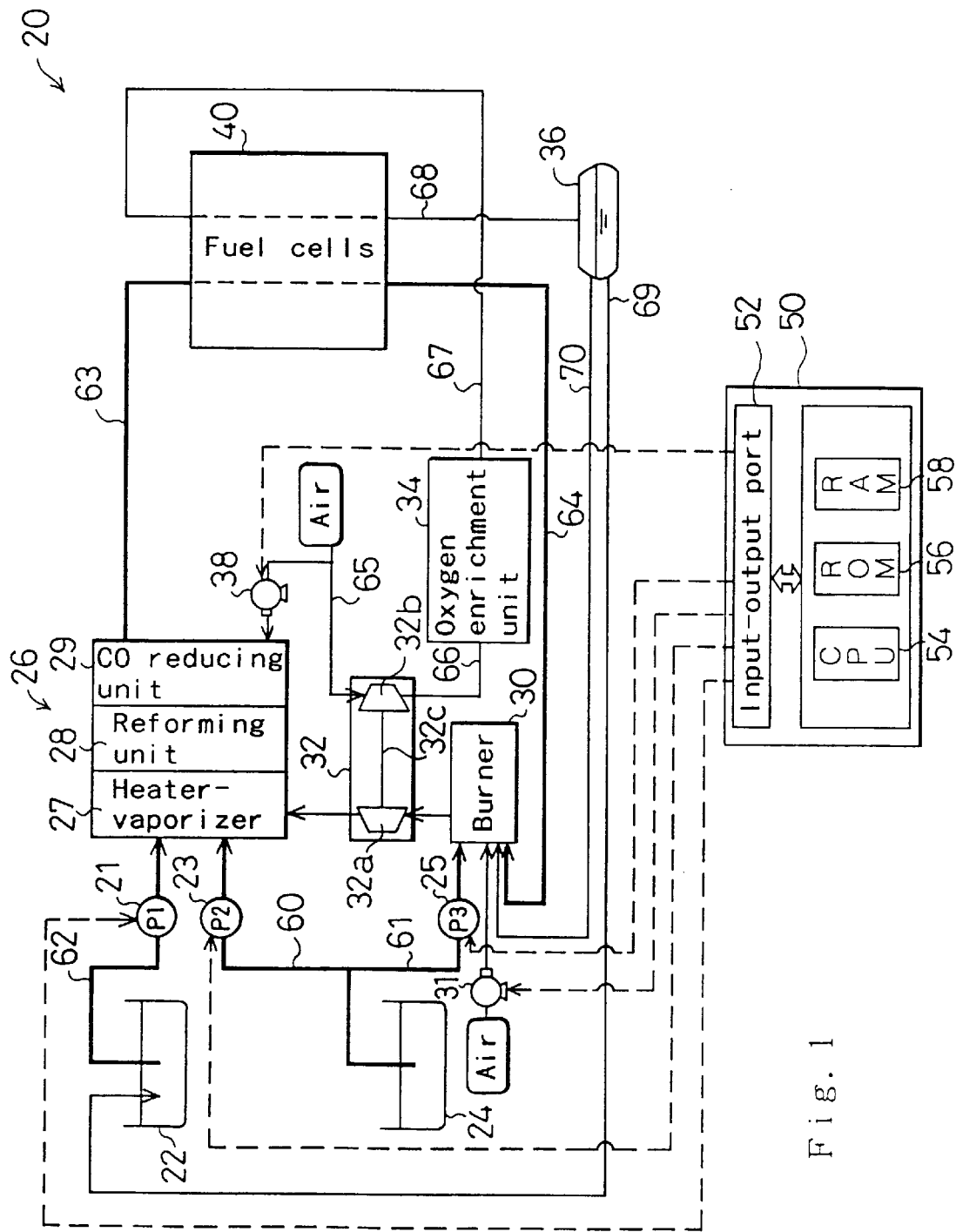
FIG. 1 is a block diagram schematically illustrating the structure of a fuel-cells system 20 that is a preferred embodiment of the invention.

Embodiments of the invention will now be explained in order to further clarify the structure and operation of the invention described above. FIG. 1 is a block diagram schematically illustrating the structure of a fuel-cells system 20 that is a preferred embodiment of the invention. The fuel-cells system 20 of this first embodiment is installed in an electric vehicle. It is composed of a fuel cell stack that functions as an electric power source for driving the electric vehicle and devices for supplying gaseous fuel and oxidizing gas to the fuel cells. The fuel-cells system 20 is characterized in that the fuel cells are supplied with oxidizing gas enriched in oxygen content by an oxygen enrichment device of magnetic field type. The overall structure of the fuel-cells system 20 according to the first embodiment will be explained first. Following this, the magnetic oxygen enrichment device that constitutes the essential portion of the invention will be explained.

The main components of the fuel-cells system 20 are a water tank 22 for storing water, a methanol tank 24 for storing methanol, a burner 30 for generating combustion gas, a compressor unit 32 for compressing air, a fuel reformer 26 for reforming raw fuel (methanol) to generate hydrogen-rich fuel gas, a stack of fuel cells 40 for producing electromotive force by electrochemical reactions, an oxygen enrichment unit 34 constituted as a magnetic oxygen enrichment device, and a control unit 50 consisting of a computer. These components of the fuel-cells system 20 will be explained in order.

The stack of fuel cells 40 consists of stacked unit cells 48 (FIG. 2) of the solid polymer type. The formulas below show the electrochemical reactions that occur in the fuel cells 40. Formula (3) represents the reaction on the anode side and Formula (4) the reaction on the cathode side. The reaction occurring in each fuel cell as a whole is shown by Formula (5).

$$H_2 \rightarrow 2H^+ + 2e_- \quad (3)$$

$$(½)O_2 + 2H^+ + 2e_- \rightarrow H_2O \quad (4)$$

$$H_2 + (½)O_2 \rightarrow H_2O \quad (5)$$

Figure 2:
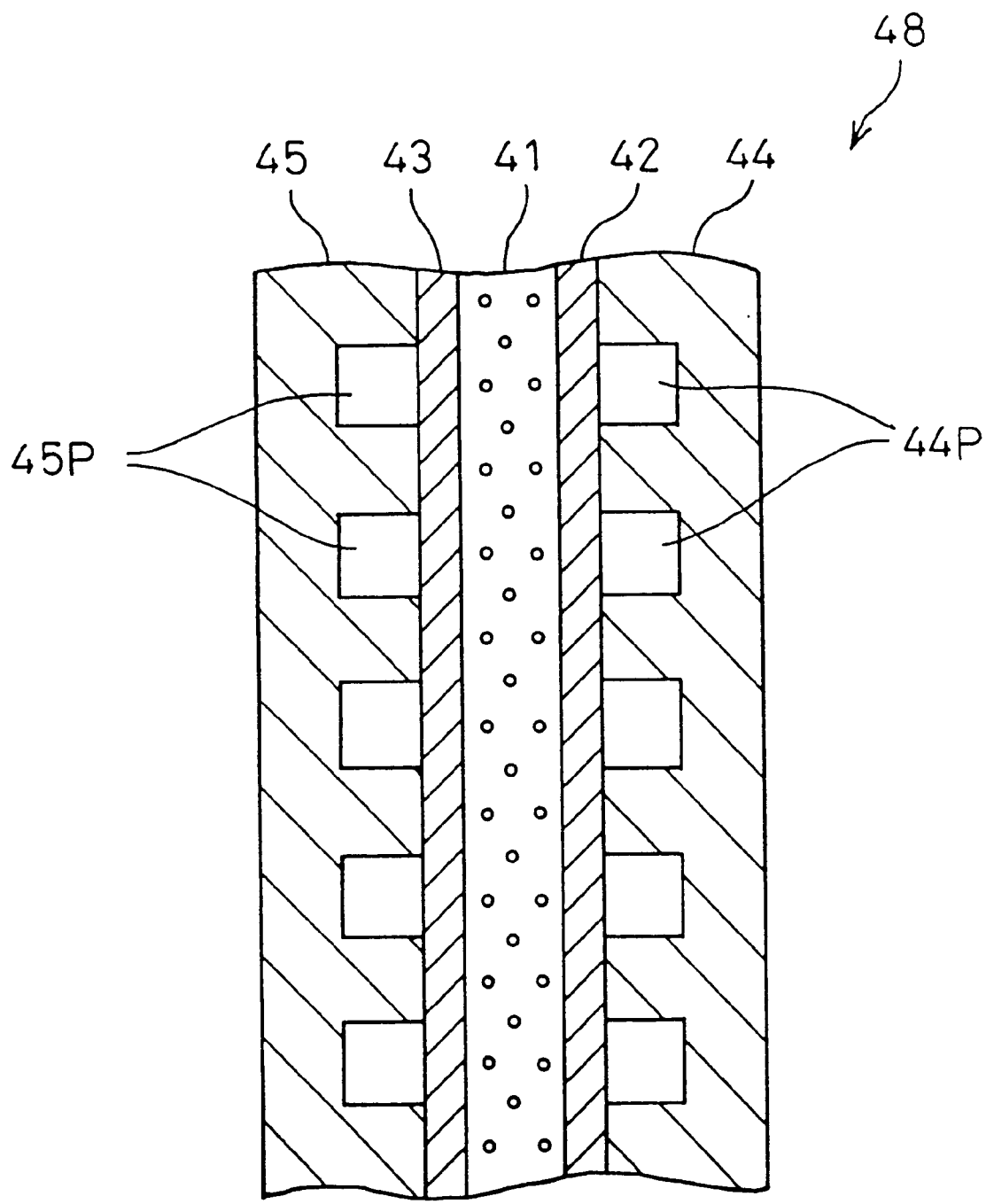
FIG. 2 is a sectional view schematically illustrating the structure of a unit cell 48 of a stack of fuel cells 40.

When the fuel cells 40 are supplied with gaseous fuel containing hydrogen on the cathode side and with oxidizing gas containing oxygen on the cathode side, the reactions indicated by Formulas (3)–(5) occur therein to produce an electromotive force. FIG. 2 is a sectional view illustrating the structure of a unit cell 48 of the stack of fuel cells 40. The unit cell 48 is composed of an electrolyte membrane 41, an anode 42, a cathode 43 and separators 44, 45.

The anode 42 and the cathode 43 are gas diffusion electrodes that form a sandwich structure with the electrolyte membrane 41 in between. The separators 44, 45 are disposed on opposite sides of the sandwich structure and are formed on their sides in contact with the anode 42 and the cathode 43 with channels for passage of gaseous fuel and oxidizing gas. Specifically, gaseous fuel channels 44P are formed between the anode 42 and the separator 44, and oxidizing gas channels 45P are formed between the cathode 43 and the separator 45. Channels are shown to be formed on only one side of each of the separators 44 and 45 in FIG. 2. In the actual structure, channel-forming ribs are formed on both sides of the separators. The ribs on one side of each separator abut on an anode 42 of one unit cell to form gaseous fuel channels 44P while those on the other abut on the cathode 43 of an adjacent unit cell to form oxidizing gas channels 45P. Each of the separators 44, 45 thus serves to form gas channels between itself and the gas diffusion electrodes on its opposite sides and to separate the gaseous fuel flow of one unit cell from the oxidizing gas flow of a neighboring unit cell. The two separators at the opposite ends of the stack of unit cells 48 can be left flat on the outside and be formed with ribs only on side making contact with a gas diffusion electrode.

The electrolyte membrane 41 is a proton-conductive ion-exchange membrane composed of a solid polymer material, such as a fluororesin, and exhibits good electrical conductivity when wet. NAFION film (perfluorosulfonic acid polymer, a product of E.I. Du Pont de Nemours & Co., Inc.) is used in this first embodiment. A coat of platinum or an alloy of platinum and other metal is applied to the surface of the electrolyte membrane 41 as a catalyst. The coating with the catalyst can be done by the method of preparing a carbon powder carrying catalyst (platinum or platinum alloy), dispersing the carbon powder carrying the catalyst in an appropriate organic solvent, adding an appropriate amount of an electrolyte solution (e.g., NAFION solution; product of Aldrich Chemical Company, Inc.) to the dispersion to form a paste, and coating the electrolyte membrane 41 with the paste by screen printing. Good results can also be obtained by forming the paste containing the carbon powder that carries the catalyst into a film-like sheet and pressing the sheet onto the electrolyte membrane 41.

The anode 42 and the cathode 43 are made of carbon cloth woven from carbon fiber thread. (The invention is not limited to the use of the carbon cloth employed in this first embodiment, however, and the anode 42 and the cathode 43 can instead be formed of carbon paper or carbon felt made of carbon fiber.)

The separators 44, 45 are made of a gas-impermeable conductive material such as dense carbon obtained by compressing carbon to a gas-impermeable state. The separators 44, 45 are provided on both sides with multiple parallel ribs, so that, as explained earlier, the side of each in contact with an anode 42 forms gaseous fuel channels 44P and the other side in contact with the cathode 43 of an adjacent unit cell forms oxidizing gas channels 45P. The ribs on one side of a separator do not have to be parallel to those on the other side and it is instead possible to form the ribs on opposite sides to intersect at a prescribed angle such as 90 degrees. The grooves (channels) between the ribs do not necessarily have to run in parallel. Any configuration is possible insofar as the formed channels can supply the gaseous fuel and the oxidizing gas to the respective gas diffusion electrodes.

The unit cell 48 of the structure explained in the foregoing is the basic structural unit of the stack of fuel cells 40. The stack of fuel cells 40 is assembled by stacking multiple unit cells 48, i.e., multiple sets (100 in this first embodiment) each composed of a separator 44, an anode 42, an electrolyte membrane 41, a cathode 43 and a separator 45 overlaid in the order mentioned. The stack is completed by fitting current collector plates formed of dense carbon, copper or the like on the opposite ends.

The components of the fuel-cells system 20 other than the fuel cells 40, and their interconnection, will now be explained. The fuel reformer 26 is composed of a heater-vaporizer 27, a reforming unit 28 and a CO reducing unit 29. The heater-vaporizer 27 vaporizes methanol and water supplied from the methanol tank 24 and the water tank 22. The vaporized methanol and water are forwarded from the heater-vaporizer 27 to the reforming unit 28 where a steam-reforming reaction occurs. As explained further later, combustion heat from the burner 30 is supplied through the compressor unit 32 to the heater-vaporizer 27 of the fuel reformer 26. The combustion heat is conducted to a heat exchanger in the heater-vaporizer 27 and heats and vaporizes the methanol and water supplied to the heater-vaporizer 27.

The methanol used as the raw fuel is fed from the methanol tank 24 to the fuel reformer 26 through a methanol line 60 equipped with a second pump 23. The amount of methanol supplied to the fuel reformer 26 can be regulated. Specifically, the second pump 23 is connected to the control unit 50 and is controlled by a signal output by the control unit 50 to regulate the amount of methanol supplied to the fuel reformer 26.

Water is fed from the water tank 22 to the fuel reformer 26 through a water line 62 equipped with a first pump 21. The amount of water supplied to the fuel reformer 26 can be regulated. Specifically, like the second pump 23, the first pump 21 is also connected to the control unit 50 and is controlled by a signal output by the control unit 50 to regulate the amount of water supplied to the fuel reformer 26. The methanol line 60 and the water line 62 are both connected to the heater-vaporizer 27 of the fuel reformer 26. The regulated amount of methanol supplied by the second pump 23 and the regulated amount of water supplied by the first pump 21 are mixed in the heater-vaporizer 27 and the resulting methanol-mixture of prescribed mixing ratio is heated and vaporized. The vaporized methanol and water constitute a raw gaseous fuel that is forwarded to the reforming unit 28 and subjected to a steam-reforming reaction. The mixing ratio of methanol and water in the heater-vaporizer 27 is set to a value that enables the steam-reforming reaction to proceed thoroughly in the reforming unit 28 and causes the reformed gas to contain a sufficient amount of steam to be usable as gaseous fuel for supply to the fuel cells 40. A steam-reforming reaction expressed by the following formulas occurs in the reforming unit 28.

$$CH_3OH \rightarrow CO + 2H_2 - 90.0 (kJ/mol) \qquad (6)$$

$$CO + H_2O \rightarrow CO_2 + H_2 + 40.5 (kJ/mol) \qquad (7)$$

$$CH_3OH + H_2O \rightarrow CO_2 + 3H_2 - 49.5 (kJ/mol) \qquad (8)$$

The methanol decomposing reaction expressed by Formula (6) and the carbon monoxide reforming reaction expressed by Formula (7) proceed simultaneously so that the reaction of Formula (8) occurs as the overall methanol steam-reforming reaction. Thus the reforming unit 28 of the fuel reformer 26 is supplied with raw gaseous fuel consisting of methanol and water heated and vaporized by the heater-vaporizer 27 and generates hydrogen-rich reformed gas by the reaction of Formula (8).

The reforming unit 28 is charged with pellets formed of a Cu—Zn catalyst, Cu and Zn being metals that catalyze the reforming reaction. The reforming unit 28 is supplied with the aforesaid raw gaseous fuel raised to a sufficiently high temperature and the reforming reaction proceeds therein to generate hydrogen-rich reformed gas. The pellets formed of Cu—Zn catalyst are obtained by preparing the catalyst metal by coprecipitation of copper and zinc oxide, adding a binder such as alumina to the catalyst metal, and extrusion molding the result to form 3–7 mm pellets. This embodiment uses pellets measuring about 3×3×3 mm. The pellets consisting of Cu—Zn catalyst are uniformly charged into the reforming unit 28. The raw gaseous fuel introduced into the reforming unit 28 comes in contact with the catalyst metal on the pellet surfaces and passes toward the side of the CO reducing unit 29 while undergoing the reforming reaction. The catalyst pellets charged into the reforming unit 28 need not necessarily be formed by the coprecipitation method but can instead be formed by some other method such as the impregnation method.

Rather than being charged with catalyst pellets in the foregoing manner, the reforming unit 28 can instead be fabricated in a honeycomb structure. In this case, the surfaces of the honeycomb carry the reforming reaction catalyst. The reforming reaction proceeds as the raw gaseous fuel passes over the honeycomb surfaces. The honeycomb carrying the catalyst can, for example, be fabricated by coating the surfaces of a metal honeycomb with alumina and then coating the resulting alumina surface with the catalyst metal, or by coating the surfaces of the honeycomb with a coating material obtained by pulverizing catalyst pellets of the type described above and adding a binder thereto.

Since, as shown by Formulas (6)–(8), the steam-reforming reaction that proceeds in the reforming unit 28 is endothermic, the reforming unit 28 must be supplied with heat from the exterior to sustain the reforming reaction. In the fuel-cells system 20 of this first embodiment, the temperature of the raw gaseous fuel is raised to a level adequate to sustain the reforming reaction during its generation by vaporization of methanol and water in the heater-vaporizer 27. Specifically, the system is configured to bring the heat needed for the reforming reaction into the reforming unit 28 from the heater-vaporizer 27 by the raw gaseous fuel. Alternatively, the reforming unit 28 can be provided with a heater or other such unit for supplying heat needed by the reforming reaction. Otherwise, it is possible to conduct an exothermic oxidizing reforming reaction in the reforming unit 28 in addition to the steam-reforming reaction and to use the heat generated by the oxidizing reforming reaction to sustain the steam-reforming reaction.

The hydrogen-rich reformed gas generated by the reforming unit 28 is forwarded to the CO reducing unit 29. The CO reducing unit 29 is a device for reducing the carbon monoxide concentration of the reformed gas supplied from the reforming unit 28 in order to supply gaseous fuel of sufficiently low carbon monoxide content to the fuel cells 40. The general methanol reforming reaction is as shown by Formulas (6)–(8) set out above. When the reforming reaction is actually effected, however, the reaction does not proceed ideally as expressed by these formulas and the gaseous fuel generated in the reforming unit 28 contains a certain amount of carbon monoxide. The CO reducing unit 29 is therefore provided to lower the carbon monoxide concentration of the gaseous fuel supplied to the fuel cells 40.

The fuel cells 40 in this embodiment are of the solid polymer type and include a platinum or platinum alloy catalyst for promoting the fuel cell reactions. (In this embodiment, the electrolyte membranes 41 are coated with a platinum catalyst.) When the gaseous fuel contains carbon monoxide, the carbon monoxide is adsorbed on the platinum catalyst and degrades the performance of the catalyst. As this inhibits the reaction at the cathode indicated by Formula (3), it degrades the performance of the fuel cells. To generate electrical power using solid polymer type cells like the fuel cells 40, therefore, it is necessary to prevent degradation of cell performance by reducing the carbon monoxide concentration of the supplied gaseous fuel to below a certain level. (The maximum allowable carbon monoxide concentration of gaseous fuel supplied to a solid polymer fuel cell is ordinarily not more than several ppm.)

The reformed gas supplied to the CO reducing unit 29 is a hydrogen-rich gas containing some amount of carbon monoxide. The CO reducing unit 29 reduces the amount of carbon monoxide in the reformed gas by oxidizing carbon monoxide preferentially to hydrogen. The CO reducing unit 29 is charged with a carrier carrying a selective carbon monoxide oxidizing catalyst such as a platinum catalyst, a ruthenium catalyst, a palladium catalyst, a gold catalyst or an alloy catalyst using one of these as the primary element. Oxygen required for the selective carbon monoxide oxidizing reaction is provided by supplying the CO reducing unit 29 with compressed air from a blower 38. The blower 38 is connected with the control unit 50, which controls the blower 38 drive rate to control the amount of compressed air supplied to the CO reducing unit 29.

Since the selective carbon monoxide oxidizing reaction effected in the CO reducing unit 29 is exothermic, the CO reducing unit 29 is equipped with an appropriate cooling system for maintaining the temperature inside the CO reducing unit 29 within a range suitable for the selective carbon monoxide oxidizing reaction. The cooling system can, for example, be one that circulates water stored in the water tank 22 through passages in the CO reducing unit 29 as a coolant.

The carbon monoxide concentration of the gaseous fuel treated by the CO reducing unit 29 is determined by the operating temperature of the CO reducing unit 29, the carbon monoxide concentration of the supplied reformed gas, the flow rate of the reformed gas supplied to the CO reducing unit 29 per unit volume of the catalyst, and other factors. Although not shown in the drawings, the CO reducing unit 29 is provided with a carbon monoxide concentration sensor connected to the control unit 50. Based on the reading received from the carbon monoxide sensor, the control unit 50 regulates the operating temperature in the CO reducing unit 29 and the reformed gas flow rate so as to control the carbon monoxide concentration of the treated gaseous fuel to or below the allowable level. The gaseous fuel reduced in carbon monoxide concentration by the CO reducing unit 29 in the foregoing manner is conducted to the fuel cells 40 through a fuel supply line 63 to be subjected to the cell reaction on the anode side. When the carbon monoxide concentration of the reformed gas generated at the reforming unit 28 is within the allowable range, the fuel reformer 26 need not be equipped with the CO reducing unit 29.

As noted earlier, high-temperature combustion gas from the burner 30 is supplied through the compressor unit 32 to the heater-vaporizer 27. The compressor unit 32 is a device for compressing air taken in from outside the fuel-cells system 20 and supplying the compressed air to the oxygen enrichment unit 34 to be explained later. The compressor unit 32 has a turbine 32*a* and a compressor 32*b*, both of the impeller type. The turbine 32*a* and the compressor 32*b* are connected by a shaft 32*c* along their common axis. The compressor 32*b* can be rotated by rotating the turbine 32*a*. The turbine 32*a* of the compressor unit 32 is driven by the high-temperature combustion gas supplied from the burner 30. The compressor 32*b* rotates together with the turbine 32*a* to compress outside air drawn in through an air intake line 65.

Since the turbine 32*a* is driven by high-temperature combustion gas from the burner 30, it is made of an alloy, ceramic or the like exhibiting ultra-high heat resistance so as to achieve heat resistance and durability. In this embodiment, it is made of a nickel-base alloy (INCONEL 700; product of Inconel, Inc.) The compressor 32*b* is made of a light-weight aluminum alloy. The compressed air from the compressor unit 32 is supplied to the oxygen enrichment unit 34, which effects oxygen enrichment and supplies the oxygen-enriched oxidizing gas to the fuel cells 40. (The structure of the oxygen enrichment unit 34 is explained in detail later.)

The burner 30 that drives the turbine 32a is supplied with fuel for combustion from the cathode side of the fuel cells 40 and from the methanol tank 24. Although, the hydrogen-rich gas generated in the fuel reformer 26 by methanol reformation is used as the fuel for the electrochemical reactions in the fuel cells 40, not all of the hydrogen supplied to the fuel cells 40 is consumed. The exhaust gaseous fuel from the fuel cells 40 containing the remaining unconsumed hydrogen is discharged through an exhaust gaseous fuel line 64 to the burner 30 where the remaining unconsumed hydrogen is completely burned, thereby enhancing fuel utilization efficiency. The burner 30 is supplied with methanol from the methanol tank 24 to make up for the fuel shortfall owing to insufficiency of the exhaust fuel and also when supply of exhaust fuel cannot be obtained from the fuel cells 40 such as at the time of fuel-cells system 20 startup. A methanol branch line 61 is provided for supplying methanol to the burner 30. The methanol branch line 61 branches off from the methanol line 60 that supplies methanol from the methanol tank 24 to the fuel reformer 26 and is equipped with a third pump 25. The third pump 25 is connected to the control unit 50 and is controlled by a drive signal from the control unit 50 to regulate the amount of methanol supplied to the burner 30.

In addition to being supplied with fuel for combustion, the burner 30 is also supplied with the oxygen needed to burn the fuel. The oxygen required for combustion is supplied as compressed air by a blower 31. The blower 31 is connected to the control unit 50 and is controlled by a drive signal from the control unit 50 to regulate the amount of compressed air supplied to the burner 30.

The combustion gas produced by the burner 30 first drives the turbine 32a and is then conducted to the heater-vaporizer 27 of the fuel reformer 26 as exhaust combustion gas. As the heat exchange efficiency of the turbine 32a is not very high (less than around 10%), most of the thermal energy produced in the burner 30 passes to the heater-vaporizer 27. As explained earlier, the heater-vaporizer 27 uses the high-temperature combustion gas supplied from the burner 30 to heat and vaporize methanol and water.

As also explained earlier, the oxidizing gas involved in the cell reaction occurring on the cathode side of the fuel cells 40 has been oxygen-enriched in the oxygen enrichment unit 34 supplied with air compressed by the compressor unit 32. The oxygen enrichment unit 34 is supplied with the air compressed by the compressor unit 32 through a compressed air line 66. The oxygen-enriched air from the oxygen enrichment unit 34 is supplied to the fuel cells 40 as oxidizing gas through an oxidizing gas line 67. (The structure of the oxygen enrichment unit 34, which is a magnetic oxygen enrichment device, is explained later.)

The oxidizing gas supplied to the fuel cells 40 through the oxidizing gas line 67 is exhausted to an exhaust oxidizing gas line 68 as exhaust oxidizing gas after being submitted to the cell reaction. The exhaust oxidizing gas line 68 is provided with a condensed water recovery vessel 36. During the electrochemical reactions in the fuel cells 40, water is produced on the anode side of the fuel cells 40 by the reaction of Formula (4) shown above. In the fuel-cells system 20 of this embodiment, the exhaust oxidizing gas containing the water produced by the cell reaction as steam is passed to the condensed water recovery vessel 36 to condense the steam (generated water) and recover it as water for reuse. The generated water recovered by the condensed water recovery vessel 36 is supplied to the water tank 22 through a water recovery line 69 and then, after being passed through the heater-vaporizer 27, is used in the steam-reforming reaction of the raw fuel conducted in reforming unit 28. The oxidizing gas removed of the generated water in the condensed water recovery vessel 36 contains residual oxygen not used in the cell reaction. It is therefore supplied through an exhaust oxidizing gas line 70 to the burner 30, which uses it in the combustion reaction.

The control unit 50 is a logic circuit configured around a microcomputer. Specifically, it comprises a CPU 54 for executing prescribed arithmetic operations and the like in accordance with a control program written in advance, a ROM 56 preloaded with the control program, control data and the like necessary for executing various types of arithmetic processing in the CPU 54, a RAM 58 for temporary reading and writing of various data also necessary for various types of arithmetic processing in the CPU 54, and an input-output port 52 for outputting drive signals to the pumps, blowers etc. based on the results of the processing by the CPU 54.

Although not shown in FIG. 1, the fuel-cells system 20 is equipped with a storage battery in addition to the fuel cells 40. The storage battery is used as a power source for driving the various pumps etc. mentioned in the foregoing during periods when a sufficient supply of power cannot be obtained from the fuel cells 40 during startup of the fuel-cells system 20. Further, although the fuel-cells system 20 was described as having separate blowers 31, 38 for supplying air to the burner 30 and the CO reducing unit 29, air can instead be supplied to both by a single blower.

The essential aspect of the invention, i.e., the aspect related to oxygen enrichment of the oxidizing gas, will now be explained. The oxygen enrichment effected in the oxygen enrichment unit 34 will be explained first. The oxygen enrichment unit 34 is a magnetic oxygen enrichment device. It utilizes the fact that the oxygen molecule is paramagnetic and exhibits high magnetic susceptibility to effect a treatment (oxygen enrichment) that increases the oxygen concentration of air. An oxygen molecule has a magnetic susceptibility of $106.2 \times 10^{-6}$ emu/g. In contrast, a nitrogen molecule has a magnetic susceptibility of $-0.43 \times 10^{-6}$ emu/g. Thus oxygen, which makes up 23% of air, is paramagnetic, while nitrogen, which makes up 75.5% of air, is diamagnetic. By utilizing these properties, nitrogen and oxygen can be separated in a magnetic field, making it possible to obtain a gas of high oxygen concentration from air. Specifically, when air is led into a magnetic field, the paramagnetic oxygen molecules migrate toward the magnetic poles, while the remaining component of the air composed predominantly of diamagnetic nitrogen molecules migrates away from the magnetic poles. Gas with a high oxygen concentration can therefore be harvested from the vicinity of the magnetic poles.

Figure 3:
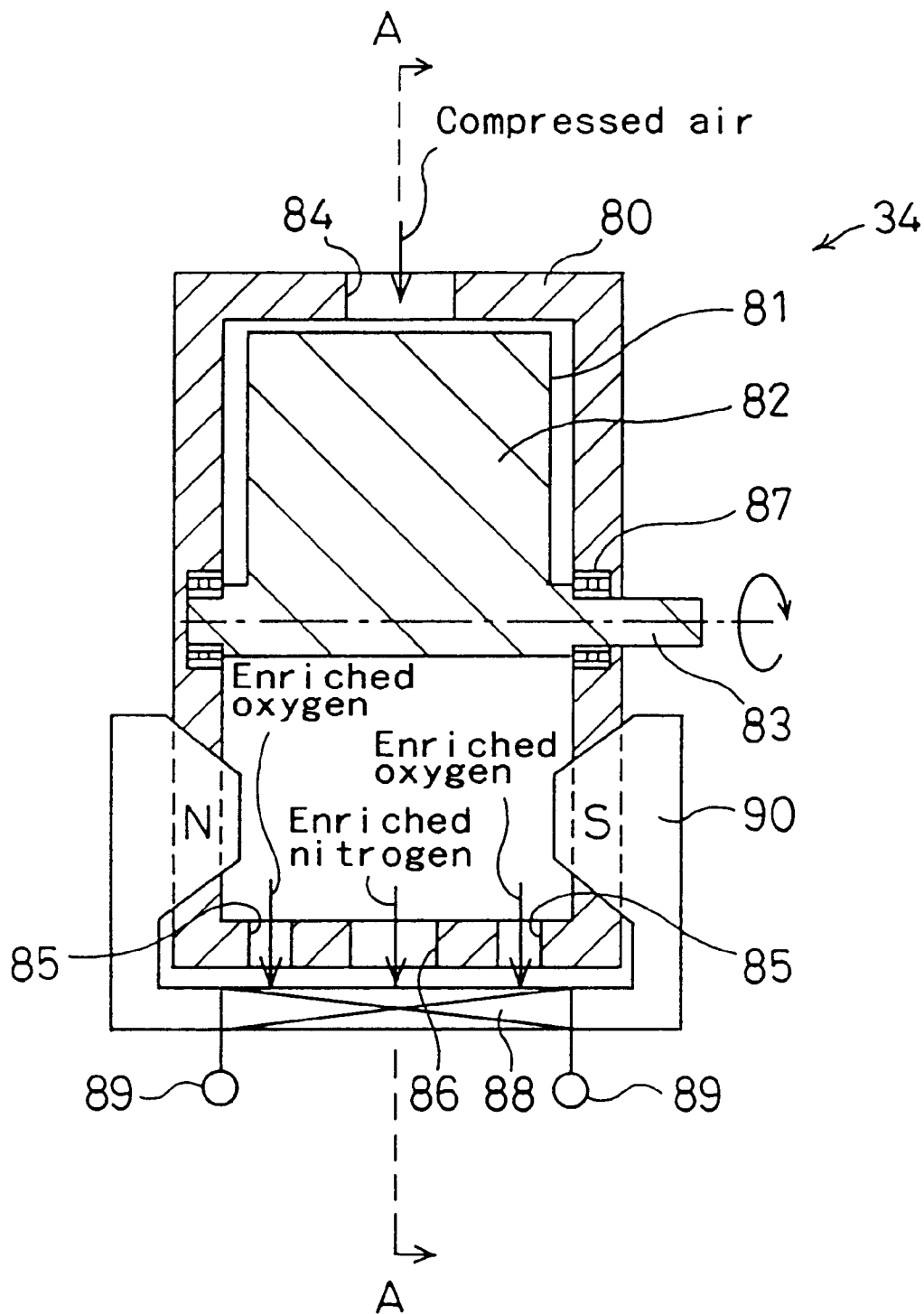
FIG. 3 is a sectional view illustrating the structure of an oxygen enrichment unit 34.
Figure 4:
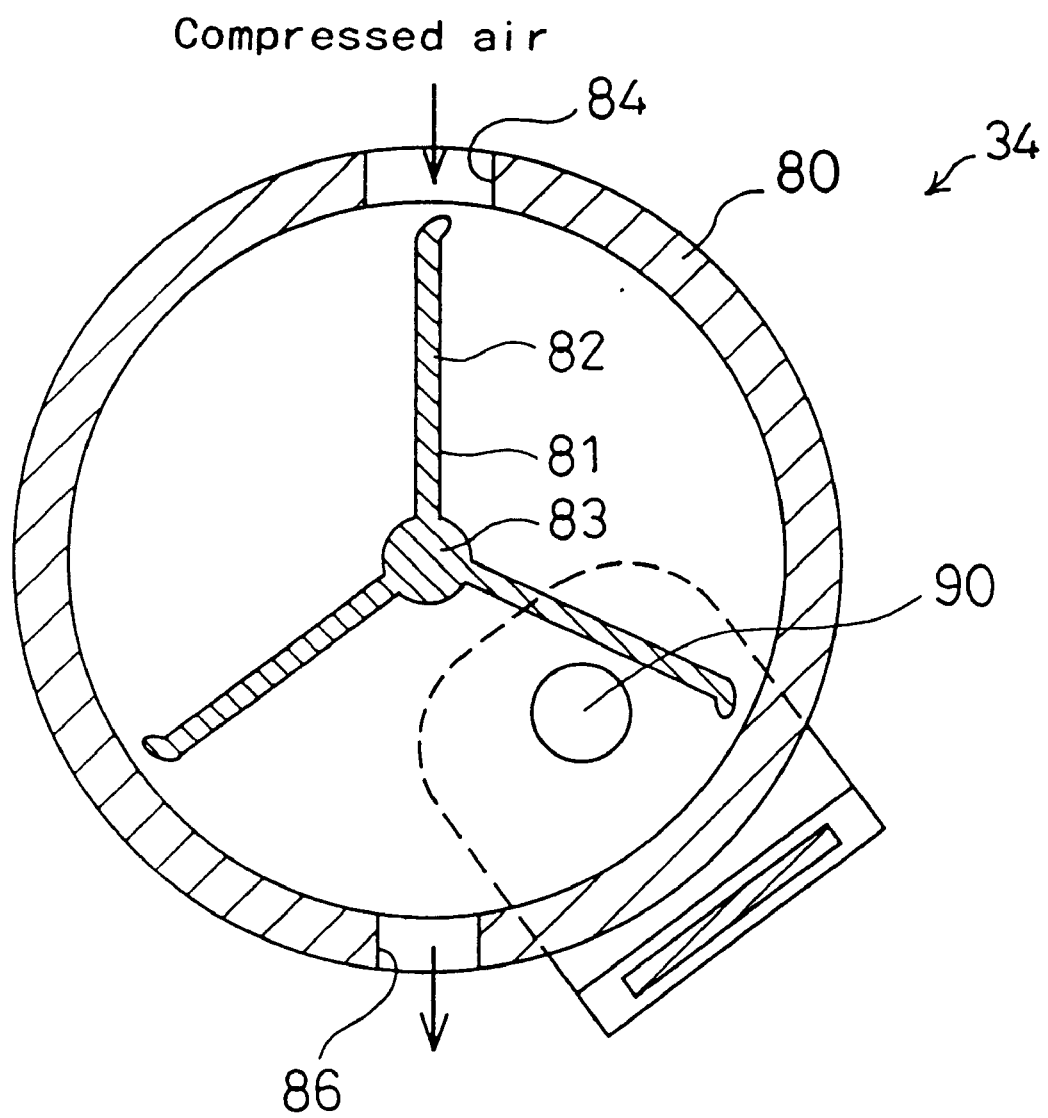
FIG. 4 is a sectional view of the oxygen enrichment unit 34 taken along section A—A in FIG. 3.

The fuel-cells system 20 of this embodiment is equipped with a rotary type magnetic oxygen enrichment device as the oxygen enrichment unit 34. FIGS. 3 and 4 schematically illustrate the structure of the oxygen enrichment unit 34. FIG. 3 is a vertical sectional view of the oxygen enrichment unit 34 and FIG. 4 is a sectional view of the oxygen enrichment unit 34 taken along section A—A in FIG. 3.

The oxygen enrichment unit 34 comprises a nonmagnetic casing 80, a nonmagnetic rotor 81 rotatably supported inside the casing 80, a magnetic field generating unit 90 attached along the casing 80 to straddle the thickness direction thereof, an air intake port 84 provided in the casing 80. Oxygen-enriched air outlets 85 provided on the N pole and S pole sides near the opposite ends of the casing 80 in the axial direction, and a nitrogen-enriched air outlet 86 provided in the casing 80 midway between the N pole and the S pole together comprising a varying oxygen-concentration gas separation unit. The casing 80 is formed of a hollow cylindrical wall and end plates on opposite ends thereof. The rotor 81 comprises a shaft 83 and multiple vanes 82. The shaft 83 is supported on the casing 80 by radial ball bearings 87 and is rotated by a motor or other such drive unit (not shown). When the shaft 83 is rotated, the vanes 82 rotate unitarily with the shaft 83 to function as a blower. The magnetic field generating unit 90 generates a magnetic field whose magnetic lines of force run in the axial direction of the shaft 83 in the inner space of the casing 80. The air intake port 84 is connected to the compressed air line 66 referred to earlier to enable intake of air compressed by the compressor unit 32. The oxygen-enriched air outlets 85 are connected to the oxidizing gas line 67 to enable supply of oxidizing gas enriched in oxygen by the oxygen enrichment unit 34 to the fuel cells 40. If desired, the oxygen concentration of the oxidizing gas can be further increased by fitting the oxygen-enriched air outlets 85 with oxygen permeable membranes that selectively pass oxygen.

The magnetic field generating unit 90, which generates a magnetic field in the space between the casing 80 and the rotor 81, comprises two magnetic poles disposed to pass through the end plates at the opposite ends of the casing 80, a connecting portion that connects the two magnetic poles externally of the casing 80, and a coil 88 wound around the connecting portion. Direct current from an appropriate direct current source is supplied to the coil 88 through terminals 89. The direct current passing through the coil 88 generates the magnetic field.

The operation of the oxygen enrichment unit 34 constituted in the foregoing manner will now be explained. The rotor 81 of the oxygen enrichment unit 34 is rotated by the drive unit, direct current is passed through the coil 88 through the terminals 89, and compressed air produced by the compressor unit 32 is introduced through the compressed air line 66 and the air intake port 84. This causes air to be discharged from the oxygen-enriched air outlets 85 and the nitrogen-enriched air outlet 86. The passage of current through the coil 88 of the magnetic field generating unit 90 generates a magnetic field between the magnetic poles in the space between the casing 80 and the rotor 81. The paramagnetic air molecules are magnetized by the action of the magnetic field. Those near the N pole are acted on by the magnetic attraction of the N pole and those near the S pole are acted on by the magnetic attraction of the S pole. Since the oxygen molecules in the compressed air entering the oxygen enrichment unit 34 are paramagnetic and exhibit a large magnetic susceptibility, they are magnetically attracted and migrate to the N and S pole sides of the magnetic field. Since the air near the N pole side and the S pole side therefore becomes rich in oxygen, oxygen-enriched air is discharged from the oxygen-enriched air outlets 85. On the other hand, the nitrogen molecules in the air supplied to the oxygen enrichment unit 34 have low magnetic susceptibility and therefore remain substantially unmagnetized. Moreover, since even if magnetized they are magnetized in the opposite polarity from the oxygen molecules owing to their diamagnetism, they migrate away from the magnetic poles. This causes the air in the middle region between the magnetic poles to become high in nitrogen concentration. The remaining air after selective removal of oxygen (i.e., nitrogen-enriched air) is therefore discharged from the nitrogen-enriched air outlet 86 provided midway of the casing 80 in the axial direction. Thus a high oxygen-concentration gas separation unit is present in a specific area in the vicinity of at least one of the poles N or S, and a low oxygen-concentration gas separation unit is present in another area farther from the magnetic pole.

Since the oxygen enrichment unit 34 is supplied with compressed air by the compressor unit 32, the oxidizing gas discharged from the oxygen enrichment unit 34 into the oxidizing gas line 67 is also in a compressed state. The cathode side of the fuel cells 40 is therefore supplied with oxidizing gas whose oxygen partial pressure has been greatly increased by both compression and oxygen enrichment.

In the first embodiment of the fuel-cells system 20 constituted in the foregoing manner, since the fuel cells 40 are supplied with oxidizing gas that has been oxygen-enriched by the oxygen enrichment unit 34, the power generating efficiency of the fuel cells 40 is enhanced. This is because the oxygen enrichment increases the oxygen partial pressure of the oxidizing gas and this in turn increases the electromotive force of the fuel cells 40. (See Nernst's equation set out earlier.)

Figure 5:
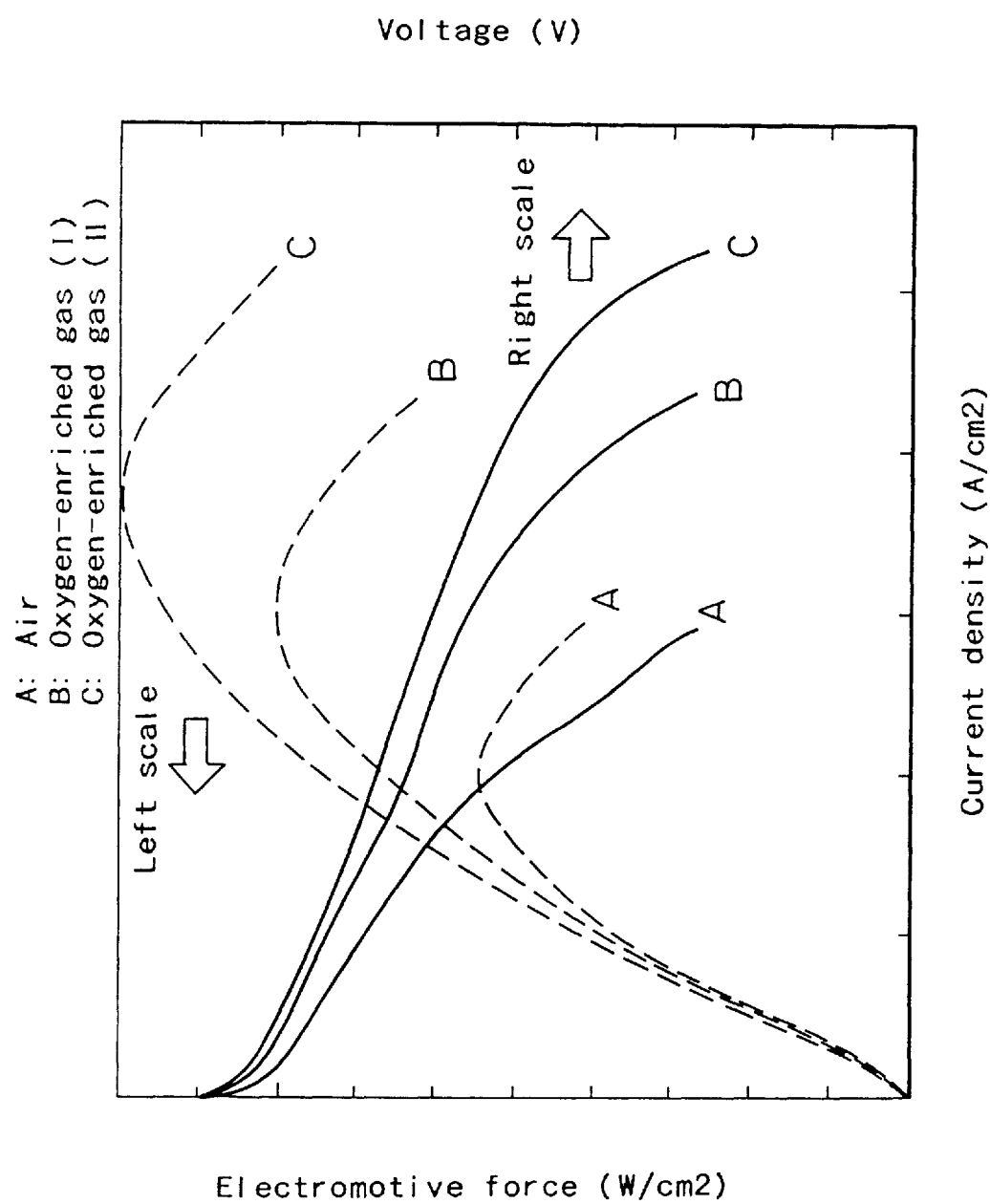
FIG. 5 is a graph showing the results obtained by simulating how electromotive force and output voltage vary as a function of output current density when oxidizing gases of different oxygen concentration are supplied to fuel cells.

FIG. 5 is a graph showing the results obtained by simulating how electromotive force and output voltage vary as a function of output current density in fuel cells like the fuel cells 40 of the first embodiment explained above when oxidizing gases of different oxygen concentration are supplied to the fuel cells. In FIG. 5, the curves A show the results when air was supplied to the fuel cells, curves B the results when high-purity oxygen gas (oxygen-enriched gas (II)) was supplied to the fuel cells, and curves B the results when air subjected to oxygen enrichment by an oxygen enrichment device of the same configuration as that in the first embodiment (oxygen-enriched gas (I)) was supplied to the fuel cells. As can be seen from FIG. 5, the fuel cell output voltage characteristic curve and the electromotive force are both improved by oxygen enrichment of the oxidizing gas supplied to the fuel cells. This effect grows more pronounced with increasing oxygen enrichment of the oxidizing gas. This clearly indicates that the provision of the oxygen enrichment unit 34 in the first embodiment can be expected to enhance the cell performance of the fuel cells 40.

The improvement of the cell performance of the fuel cells 40 in this manner enhances the energy efficiency of the overall fuel-cells system. Owing to the improved energy efficiency, the size of the fuel cells needed to produce a given amount of power and, accordingly, the size of the overall fuel-cells system can be made smaller than in the case of not effecting oxygen enrichment. When, as in the first embodiment, fuel cells are used as a power source for driving a vehicle, the ability to reduce the fuel-cells system size is particularly advantageous in light of the limited mounting space available and provides greater freedom in vehicle design. Moreover, since the magnetic oxygen enrichment device adopted as the oxygen enrichment unit 34 in the first embodiment enables thorough oxidation enrichment of the oxidizing gas supplied to the fuel cells by a compact oxygen enrichment device of excellent durability, it can be used to configure a fuel-cells system suitable for vehicle installation. The oxidizing gas oxygen enrichment performance of the oxygen enrichment unit 34 is determined by the intensity of the magnetic field generated by the magnetic field generating unit 90 as represented by the magnetic flux density shown by the following equation.

$$B = \mu H, \text{ provided that } H \ni i \tag{9}$$

where, B: magnetic flux density, H: magnetic field intensity, $\mu$: substance magnetic permeability, n: number of coil winds, i: coil current From Equation (9) it can be seen that the produced magnetic field intensity is determined by the magnitude of the current i consumed by the coil 88 and the number of coil winds of the coil 88. Therefore, even if the current i consumed by the coil 88 is kept low to minimize the power consumed by the oxygen enrichment unit 34, a sufficiently intense magnetic field can still be maintained by providing the coil 88 with a very large number of winds. By this, the power consumed to generate the magnetic field can be suppressed to realize high energy efficiency of the fuel-cells system 20 as a whole. Since the magnetic field generating unit 90 including the coil 88 in the fuel-cells system 20 according to the first embodiment is provided on the outside of the casing 80, the number winds of the coil 88 is little restricted by the size and shape of the casing 80. The magnetic flux density can therefore readily be increased by increasing the number of coil winds. The provision of the magnetic field generating unit 90 on the outside of the casing 80 also simplifies the work of winding the coil 88 at the time of fabricating the oxygen enrichment unit 34. It therefore helps to lower cost.

The power consumed to generate the magnetic field in the oxygen enrichment unit 34, i.e., the direct current supplied to the coil 88, can be supplied from the fuel cells 40, from a separate power storage unit, or from both the fuel cells 40 and a separate power storage unit. If the aforementioned storage battery for supplying the power needed at fuel-cells system 20 startup etc. is used as the separate power storage unit, no special power storage unit need be provided for generating the magnetic field in the oxygen enrichment unit 34. Since the magnetic field required in the oxygen enrichment unit 34 is generated by use of an electromagnet which can be made capable of generating a magnetic field of the required intensity by selecting the number of winds of the coil 88, the device does not have to be enlarged to generate a magnetic field of the required intensity. Moreover, generation of the magnetic field in the oxygen enrichment unit 34 does not necessarily have to be effected by use of an electromagnet as described in the foregoing but can instead be effected by use of a permanent magnet insofar as generation of a magnetic field of adequate intensity in the prescribed space can be achieved. Since no electric power is consumed for generation of the magnetic field in this case, the energy efficiency is higher than that when using an electromagnet.

In the example just described, the required magnetic flux density is secured by providing the coil 88 with a sufficiently large number of winds. Owing to the relationship expressed by Equation (9), however, the magnetic flux density can also be heightened and the oxygen enrichment efficiency enhanced by making $\mu$ large. Specifically, by forming the interior of the solenoid at the magnetic field generating unit 90 (i.e., the aforesaid member consisting of the magnetic poles and the connecting portion and forming the internal magnetic field) of a substance that makes the value of $\mu$ large, the intensity of the magnetic field can be increased and the power consumed to generate the magnetic field further reduced. Substances that can be used to make the value of $\mu$ in Equation (9) large include PERMALLOY (nickel based alloy with high magnetic permeability), SENDUST (nickel based alloy high magnetic permeability) pure iron, magnetic soft iron and the like.

Figure 6:
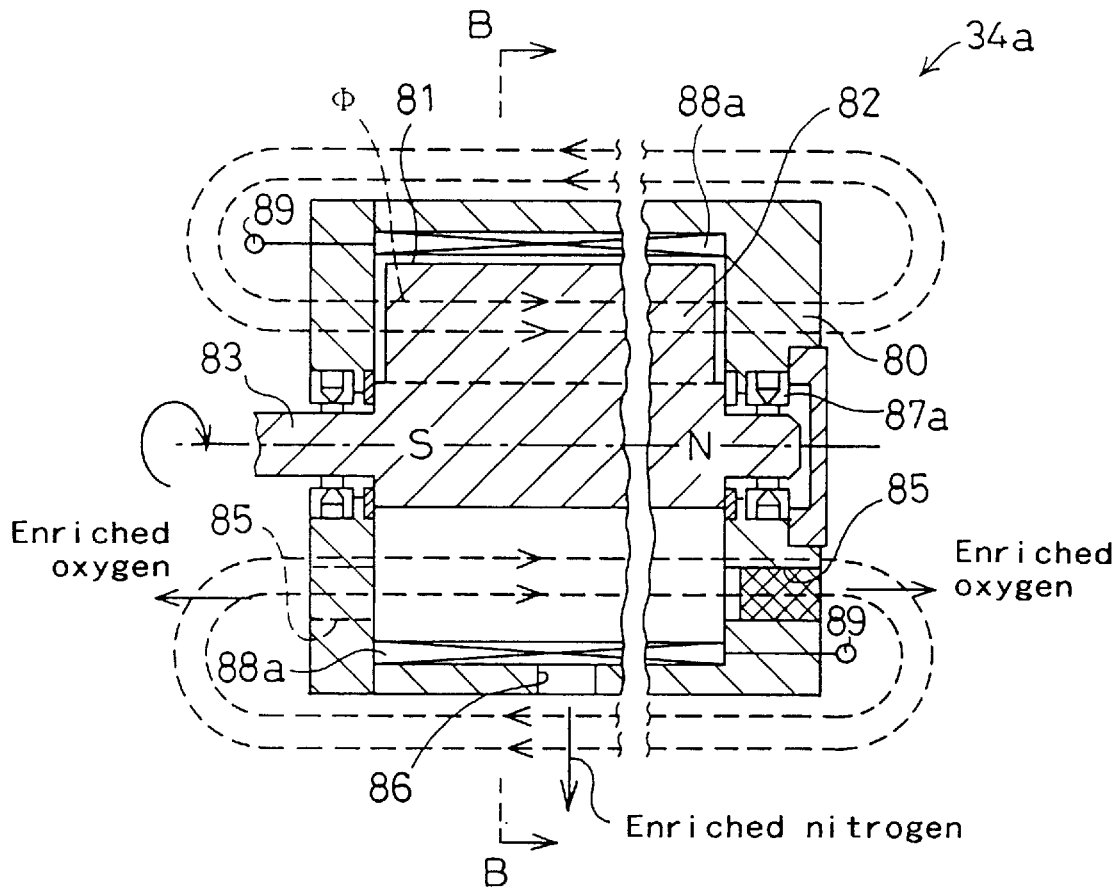
Figure 7:
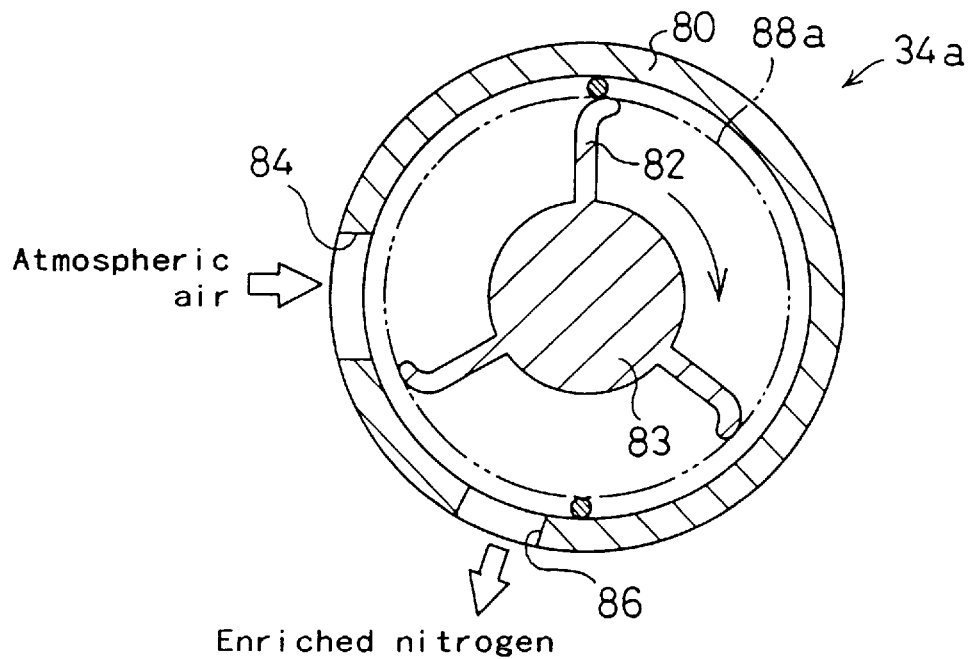
FIG. 7 is a sectional view of the oxygen enrichment unit 34a taken along section B—B in FIG. 6.

Rather than being provided on the outside of the casing 80 of the oxygen enrichment unit 34 in the foregoing manner, the magnetic field generating unit 90 can instead be provided inside the casing 80. An oxygen enrichment unit 34a configured in this manner by modifying the oxygen enrichment unit 34 of the first embodiment is shown in FIGS. 6 and 7. Members of the oxygen enrichment unit 34a shown in FIGS. 6 and 7 that are the same as those of the oxygen enrichment unit 34 of the first embodiment are assigned like reference symbols to those of the oxygen enrichment unit 34 and will not be explained again. Unlike the oxygen enrichment unit 34 of the first embodiment, the oxygen enrichment unit 34a has a coil 88a provided along its inner wall surface. Further, the oxygen-enriched air outlets 85 are provided in the end plates at opposite ends of the casing 80 in the axial direction. As in the oxygen enrichment unit 34, the nitrogen-enriched air outlet 86 is provided at the middle of the wall of the casing 80 in the axial direction.

In the oxygen enrichment unit 34a of this structure, when direct current is supplied from a prescribed direct current source through the terminals 89 to the coil 88a, a magnetic field is generated as indicated by the broken lines in FIG. 6. The oxygen molecules in the air taken in through the air intake port 84 are magnetized by this magnetic field and drawn toward the magnetic pole sides. As a result, oxygen-enriched air is discharged from the oxygen-enriched air outlets 85.

The magnetic oxygen enrichment device constituting the oxygen enrichment unit 34 can be configured in still other ways. For example, it is possible to provide the coil that generates the magnetic field on the outer peripheral surface of the shaft 83 rather than on the inner wall of the casing or to incorporate multiple rotors in the casing. Any magnetic oxygen enrichment device that enables the oxygen enrichment unit to be installed in the prescribed space and to generate a sufficiently intense magnetic field for oxygen enrichment can be incorporated in the fuel-cells system as an oxygen enrichment unit capable of providing the same effects as those of the oxygen enrichment unit 34 of the first embodiment.

In the fuel-cells system 20 according to the first embodiment, since the oxygen enrichment unit 34 effects the oxygen enrichment using air taken in from the exterior, no need arises to prepare the fuel-cells system 20 in advance by loading it with oxidizing gas for supply to the fuel cells 40 or to replenish the loaded oxidizing gas when it runs short. The system can therefore be simpler in configuration and lower in cost than in the case of loading the oxidizing gas in the form of bottled oxidizing gas or the like because provision of a facility for handling high-pressure gas is unnecessary. In addition, since the distance that the electric vehicle equipped with the fuel-cells system 20 according to the first embodiment can travel has no connection with an amount of loaded oxidizing gas, a long driving range can be secured without loading the vehicle with a large amount of oxidizing gas that takes up additional space. The degree of vehicle design freedom is better in proportion.

In the fuel-cells system 20 according to the first embodiment, since the air is first compressed by the compressor unit 32 and the compressed air is supplied to the oxygen enrichment unit 34, the effect of enhancing the power generating efficiency can be further strengthened. Specifically, the compression by the compressor unit 32 on top of the oxygen enrichment by the oxygen enrichment unit 34 further boosts the oxygen partial pressure of the oxidizing gas supplied to the fuel cells 40 and this in turns works to improve the cell performance of the fuel cells 40.

As explained earlier, the oxygen enrichment unit 34 provided in the fuel-cells system 20 according to the first embodiment is constituted as a rotary type oxygen enrichment device that has the rotor 81 rotatably supported inside the casing 80 and generates the magnetic field in the space between the rotor 81 and the casing 80. However, another type of magnetic oxygen enrichment device can be used instead. For instance, a piston type or batch type oxygen enrichment device can be adopted. Use of a rotary type oxygen enrichment device as in the first embodiment is, however, advantageous over use of other types of magnetic oxygen enrichment devices in such points as oxygen yield during oxygen enrichment (oxygen concentration of the oxygen-enriched air produced), flow rate of the oxygen-enriched air produced, and performance during continuous operation.

In the first embodiment, the compressor unit 32 and the oxygen enrichment unit 34 are provided as separate units and the air compressed by the compressor unit 32 is supplied to the oxygen enrichment unit 34. Instead, however, the compressor and the oxygen enrichment unit can be integrated and the compression and oxygen enrichment of air be conducted simultaneously. A second embodiment of the invention configured in this manner will now be explained.

Figure 8:
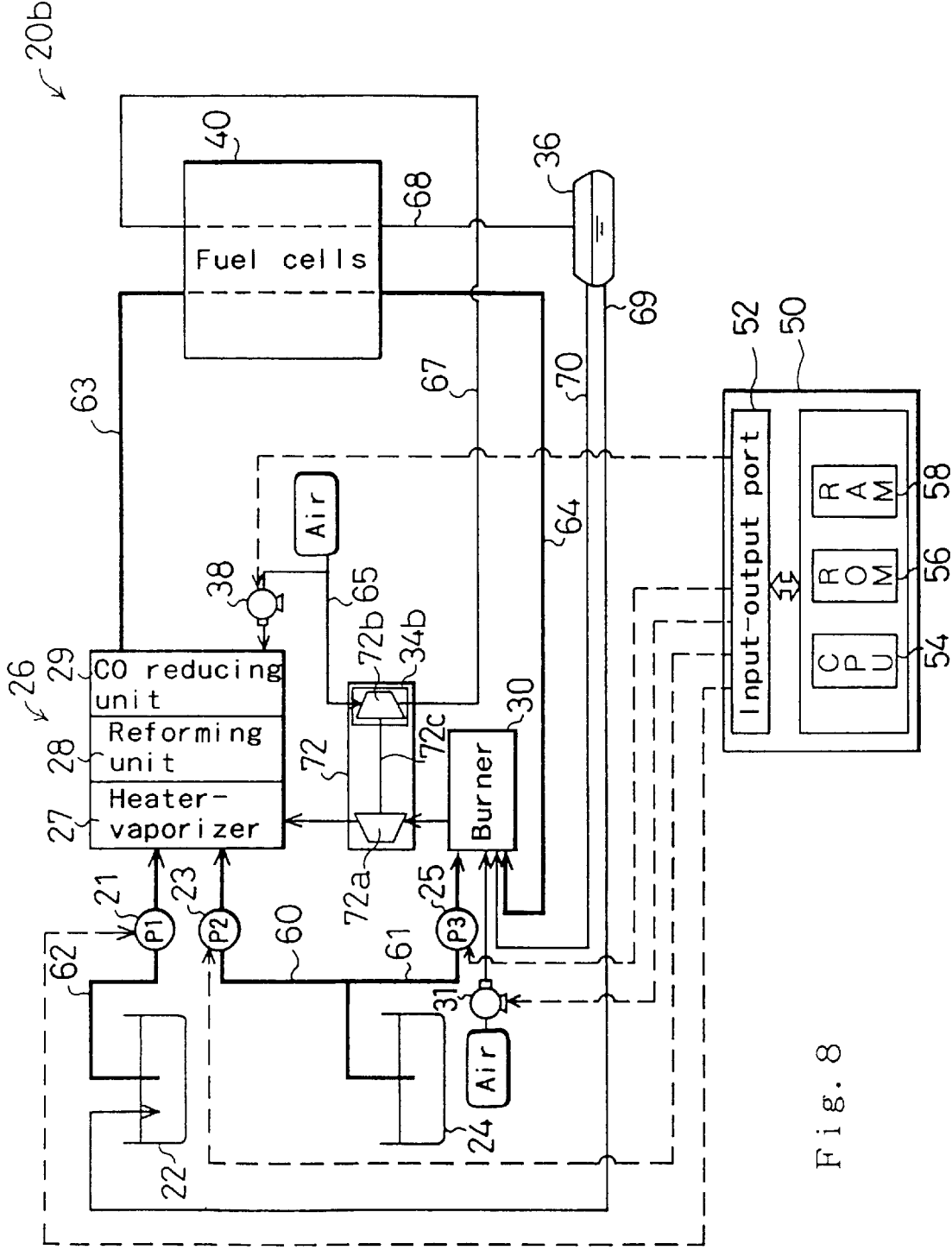
FIG. 8 is a block diagram schematically illustrating the structure of a fuel-cells system 20b.
Figure 9:
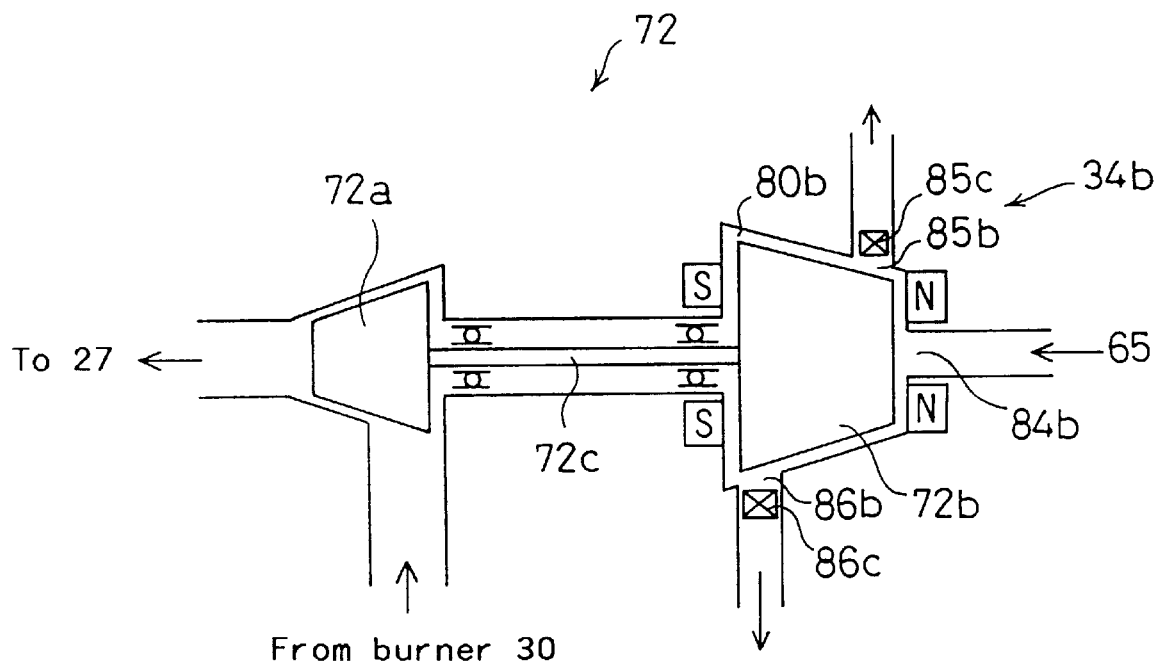
FIG. 9 is diagram schematically showing the structure of a compressor 72.

FIG. 8 is a block diagram schematically illustrating the structure of a fuel-cells system 20b that is a second embodiment of the invention. Since the fuel-cells system 20b according to the second embodiment is configured similarly to the fuel-cells system 20 of the first embodiment, members thereof that are the same as those of the first embodiment are assigned like reference symbols to those of the first embodiment and will not be explained again. Unlike the fuel-cells system 20, the fuel-cells system 20b is equipped with a compressor unit 72 that internally incorporates an oxygen enrichment unit 34b constituted as a magnetic oxygen enrichment device. Like the compressor unit 32 of the first embodiment, the compressor unit 72 also compresses air but it also simultaneously conducts oxygen enrichment. FIG. 9 shows the structure of the compressor 72.

Like the compressor unit 32 of the first embodiment, the compressor unit 72 has a turbine 72a and a compressor 72b that are connected by a shaft 72c. The components are housed in a casing 80b. As in the first embodiment, the turbine 72a is driven by combustion gas supplied from the burner 30 to thereby rotate the compressor 72b and cause it to compress air taken in from the compressor 72b side. In the compressor unit 72, the oxygen enrichment unit 34b is formed by the compressor 72b and the surrounding region.

In the peripheral region of the compressor 72b, the N pole of a permanent magnet is disposed on the side corresponding to an end portion of the compressor unit 72 and the S pole of the permanent magnet is disposed on the side corresponding to the middle portion of the compressor unit 72, whereby a magnetic field is produced at the peripheral region of the compressor 72b in the axial direction of the compressor unit 72. The compressor unit 72 is provided axially outward of the compressor 72b with an air intake port 84b for taking outside air into the compressor unit 72 through the air intake line 65. The casing 80b of the compressor unit 72 is formed toward the axially outward end of the compressor 72b with an oxygen-enriched air outlet 85b and toward the axially inward end thereof with a residual air outlet 86b. The impeller of the compressor 72b is of small radius and tapers outward. As the casing 80b follows the shape of the compressor 72b, the volume of the space between the casing 80b and the compressor 72b also decreases outward. The residual air outlet 86b is provided with a pressure control valve 86c and the oxygen-enriched air outlet 85b is provided with a flow rate control valve 85c. The pressure control valve 86c and the flow rate control valve 85c are connected to the control unit 50, which controls their drive states. The pressure state inside the casing 80b can be regulated by controlling the pressure control valve 86c and the amount of oxidizing gas supplied to the fuel cells 40 can be regulated by controlling the flow rate control valve 85c.

When the compressor 72b is rotated, air is taken in through the air intake port 84 and compressed as explained above. At the same time, oxygen molecules present in the air are separated by the action of the magnetic field. The paramagnetic oxygen molecules are magnetized in the magnetic field and migrate toward the N pole. The compressor 72b driven by rotation of the turbine 72a takes in air through the air intake port 84 and compresses it. Compressed oxygen-enriched air is therefore discharged from the oxygen-enriched air outlet 85b to be supplied to the cathode side of the fuel cells 40 through the oxidizing gas line 67. Although the oxygen enrichment unit 34b of the second embodiment uses a permanent magnet to generate the magnetic field for oxygen separation, it can instead use an electromagnet for this purpose as in the first embodiment.

In the fuel-cells system 20b according to the second embodiment configured in the foregoing manner, since the magnetic oxygen enrichment device built into the interior of the compressor unit 72 produces oxygen-enriched air that is supplied to the fuel cells 40 as oxidizing gas, effects similar to those of the fuel-cells system 20 according to the first embodiment can be obtained. Since a magnetic oxygen enrichment device is incorporated into the interior of the compressor unit 72 in the fuel-cells system 20b according to the second embodiment, compression and oxygen enrichment of the air can be effected simultaneously. This structure also ensures the extremely high efficiency of oxygen enrichment. The overall structure of the system is therefore simplified and made more compact. The simplification of the system structure is a particular advantage when the fuel-cells system 20b is installed in a vehicle and the fuel cells are utilized as a power source for driving the vehicle, because it increases the freedom of vehicle design.

In the fuel-cells system 20b according to the second embodiment, since the oxygen enrichment unit 34b is built into the interior of the compressor unit 72, the oxygen enrichment device can be driven by high-pressure gas discharged from a prescribed member constituting the fuel-cells system (combustion gas supplied by the burner 30 in the second embodiment). Since no energy therefore need be consumed especially for driving the magnetic oxygen enrichment device, the increase in the oxygen partial pressure of the oxidizing gas supplied to the fuel cells is not achieved at the expense of the energy efficiency of the overall fuel-cells system.

In the oxygen enrichment unit 34b of the compressor unit 72 of the second embodiment, since the volume of the space between the casing 80b and the compressor 72b is formed to be smaller in the vicinity of the oxygen-enriched air outlet 85b than in the vicinity of the residual air outlet 86b, oxygen, which is contained in air at a lower content than nitrogen, can be more effectively enriched. Specifically, the migration of the magnetized oxygen molecules toward the narrower side of smaller volume heightens the effect of oxygen enrichment in the vicinity of the oxygen-enriched air outlet 85b and thus enables supply of more highly oxygen-enriched oxidizing gas to the fuel cells 40.

As explained above, in the oxygen enrichment unit 34b of the second embodiment, the oxygen-enriched air outlet 85b is provided only at the end of the oxygen enrichment unit 34b on the side thereof having smaller internal volume so as to obtain oxidizing gas having higher oxygen partial pressure. However, since the oxygen molecules magnetized by the magnetic field in the oxygen enrichment unit 34b shown in FIG. 9 migrate toward both the N pole and the S pole, oxygen enrichment also occurs on the side of the oxygen enrichment unit 34 having larger internal volume, i.e., at the end on the side provided with the residual air outlet 86b. It is also therefore possible to provide an oxygen-enriched air outlet in the oxygen enrichment unit 34b at its end toward the side provided with the S pole and to discharge oxygen-enriched air from the vicinity of both magnetic poles. In this case, a nitrogen-enriched air outlet can be provided midway between the magnetic poles similarly to the oxygen enrichment unit 34 in the first embodiment. When oxygen-enriched air is harvested from the vicinity of both poles, the cross-sectional area of the oxygen enrichment unit can be made uniform throughout, without the aforesaid volume change, as in the oxygen enrichment unit 34 of the first embodiment.

In the second embodiment, the oxygen enrichment unit 34b constituted as a magnetic oxygen enrichment device is incorporated into the interior of the compressor unit 72 and this magnetic oxygen enrichment device is driven by supplying combustion gas produced by the burner 30 to the compressor unit 72. The magnetic oxygen enrichment device can, however, instead be driven using high-pressure gas produced by members constituting the fuel-cells system other than the burner 30. A third embodiment of the invention configured in this manner will now be explained.

Figure 10:
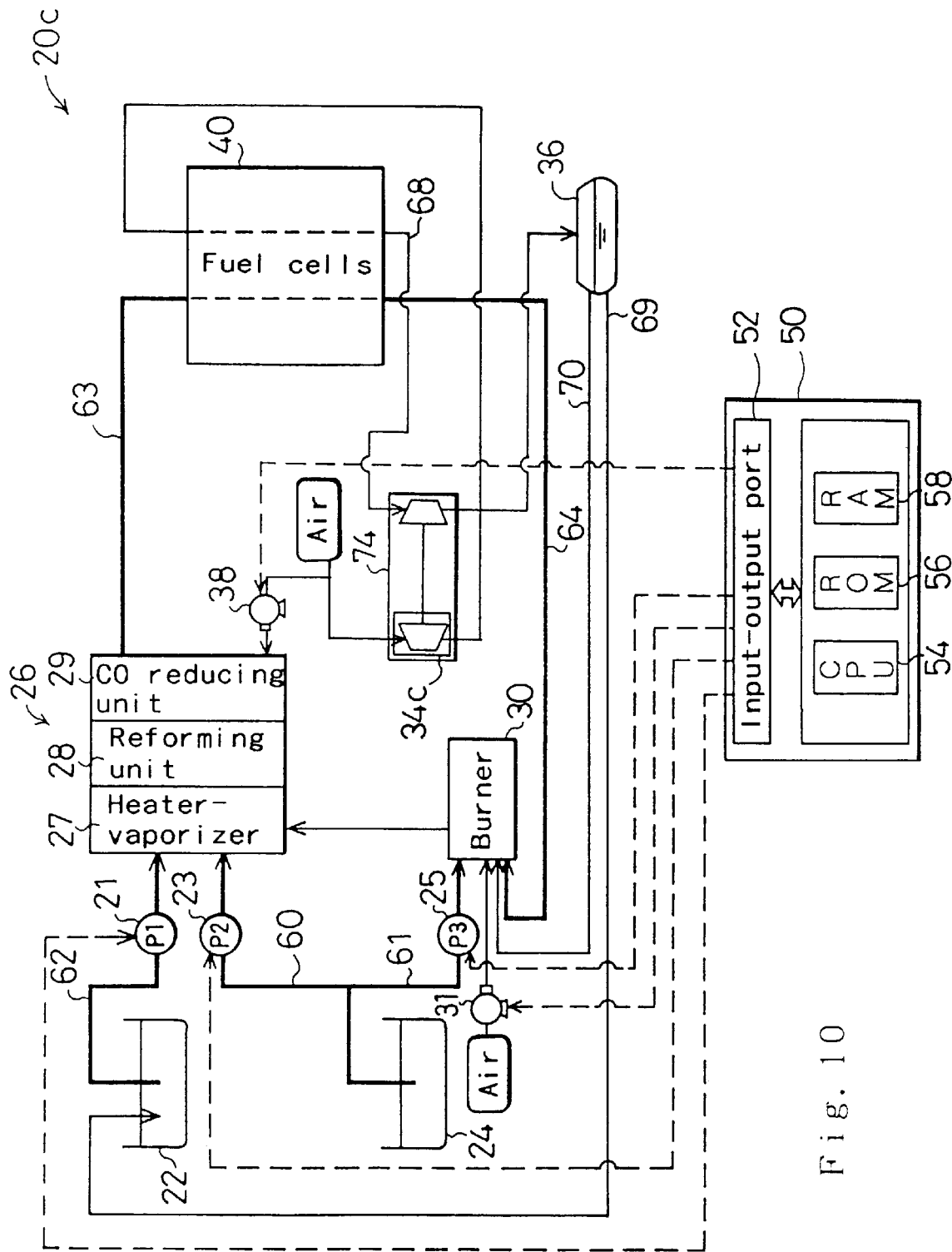
FIG. 10 is a block diagram schematically illustrating the structure of a fuel-cells system 20c.

FIG. 10 is a block diagram schematically illustrating the structure of a fuel-cells system 20c that is a third embodiment of the invention. Since the fuel-cells system 20c is configured similarly to the fuel-cells system 20 according to the first embodiment, members thereof that are the same as those of the first embodiment are assigned like reference symbols to those of the first embodiment and will not be explained again. The fuel-cells system 20c according to the third embodiment is equipped with an oxygen enrichment unit 34c. The oxygen enrichment unit 34c is incorporated into the interior of a compressor unit 74 driven by exhaust oxidizing gas discharged from the fuel cells 40. Specifically, in the fuel-cells system 20c according to the third embodiment, the compressor unit 74, which is similar to the compressor unit 72 provided in the fuel-cells system 20b according to the second embodiment, is driven not by combustion gas supplied from the burner 30 but instead by exhaust oxidizing gas discharged from the fuel cells 40. In this fuel-cells system 20c, the combustion gas produced by the burner 30 is supplied directly to the heater-vaporizer 27 of the fuel reformer 26. After having been used to drive the compressor unit 74, the exhaust oxidizing gas is delivered to the condensed water recovery vessel 36 as in the earlier embodiments.

The effects that the first and second embodiments achieve by supplying oxygen-enriched, compressed air to the fuel cells as the oxidizing gas are also achieved by the fuel-cells system 20c according to the third embodiment. In addition, like the fuel-cells system 20b according to the second embodiment, the fuel-cells system 20c also achieves a simplified configuration by incorporating the oxygen enrichment unit into the compressor unit. Moreover, in the fuel-cells system 20c, the compressor unit 74 incorporating the oxygen enrichment unit 34c is driven by exhaust oxidizing gas discharged from the fuel cells 40. Since no energy therefore need be consumed especially for driving the oxygen enrichment unit 34c, the oxygen enrichment of the oxidizing gas by the oxygen enrichment unit 34c is not achieved at the expense of the energy efficiency of the overall fuel-cells system 20c.

As explained in the foregoing, the compressor unit 74 uses the energy of the exhaust oxidizing gas discharged from the fuel cells 40 to compress the oxidizing gas supplied to the fuel cells 40. In this arrangement, a gear mechanism can be provided to establish a gear ratio between the turbine and compressor sides of the compressor unit 74 so as to secure the rotational speed on the compressor side needed to ensure that the oxidizing gas supplied to the fuel cells 40 is increased to a sufficiently high level. When the oxidizing gas cannot be sufficiently compressed by the energy of the exhaust oxidizing gas discharged by the fuel cells 40 alone, the energy of the exhaust oxidizing gas can be supplemented to achieve adequate oxidizing gas compression.

Figure 11:
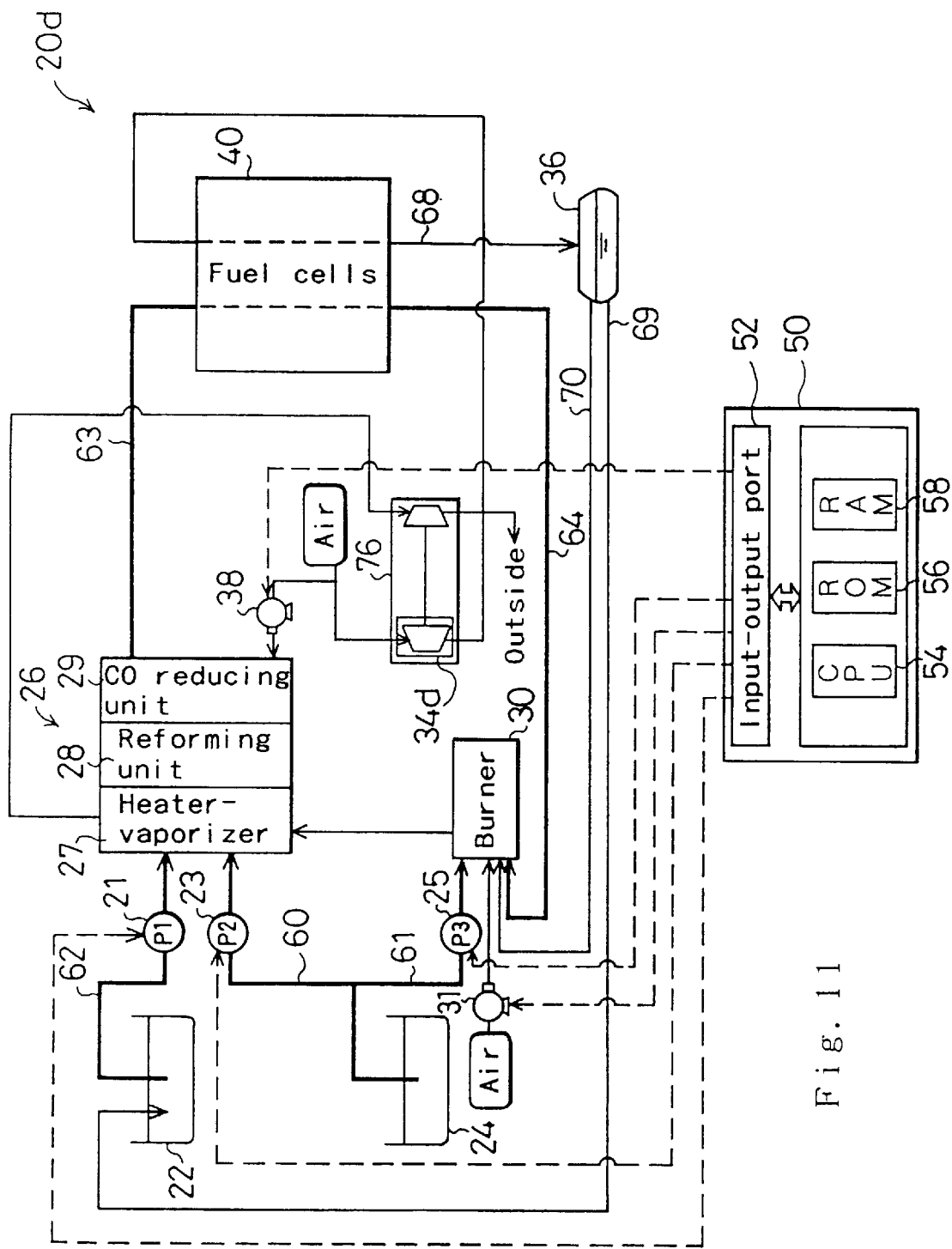
FIG. 11 is a block diagram schematically illustrating the structure of a fuel-cells system 2d.

A fourth embodiment will now be explained in which the oxygen enrichment unit is driven using combustion exhaust gas discharged by the heater-vaporizer of the fuel-cells system. FIG. 11 is a block diagram schematically illustrating the structure of a fuel-cells system 20d that is a fourth embodiment of the invention. Since the fuel-cells system 20d is configured similarly to the fuel-cells system 20 according to the first embodiment, members thereof that are the same as those of the first embodiment are assigned like reference symbols to those of the first embodiment and will not be explained again. The fuel-cells system 20d according to the fourth embodiment is equipped with an oxygen enrichment unit 34d. The oxygen enrichment unit 34d is incorporated into the interior of a compressor unit 76 driven by combustion exhaust gas discharged from the heater-vaporizer 27. Specifically, in the fuel-cells system 20d according to the fourth embodiment, the compressor unit 76, which is similar to the compressor unit 72 provided in the fuel-cells system 20b according to the second embodiment, is driven not by combustion gas supplied from the burner 30 but instead by combustion exhaust gas discharged from the heater-vaporizer 27. In this fuel-cells system 20d, the combustion gas produced by the burner 30 is supplied directly to the heater-vaporizer 27 of the fuel reformer 26 as in the third embodiment.

The effects that the earlier embodiments achieve by supplying oxygen-enriched, compressed air to the fuel cells as the oxidizing gas are also achieved by the fuel-cells system 20d according to the fourth embodiment. In addition, like the second and third embodiments, the fuel-cells system 20d also achieves a simplified configuration by incorporating the oxygen enrichment unit into the compressor unit. Moreover, in the fuel-cells system 20d, the compressor unit 76 incorporating the oxygen enrichment unit 34d is driven by combustion exhaust gas discharged from the heater-vaporizer 27. Since no energy therefore need be consumed especially for driving the oxygen enrichment unit 34d, the oxygen enrichment of the oxidizing gas by the oxygen enrichment unit 34d is not achieved at the expense of the energy efficiency of the overall fuel-cells system 20d.

Figure 12:
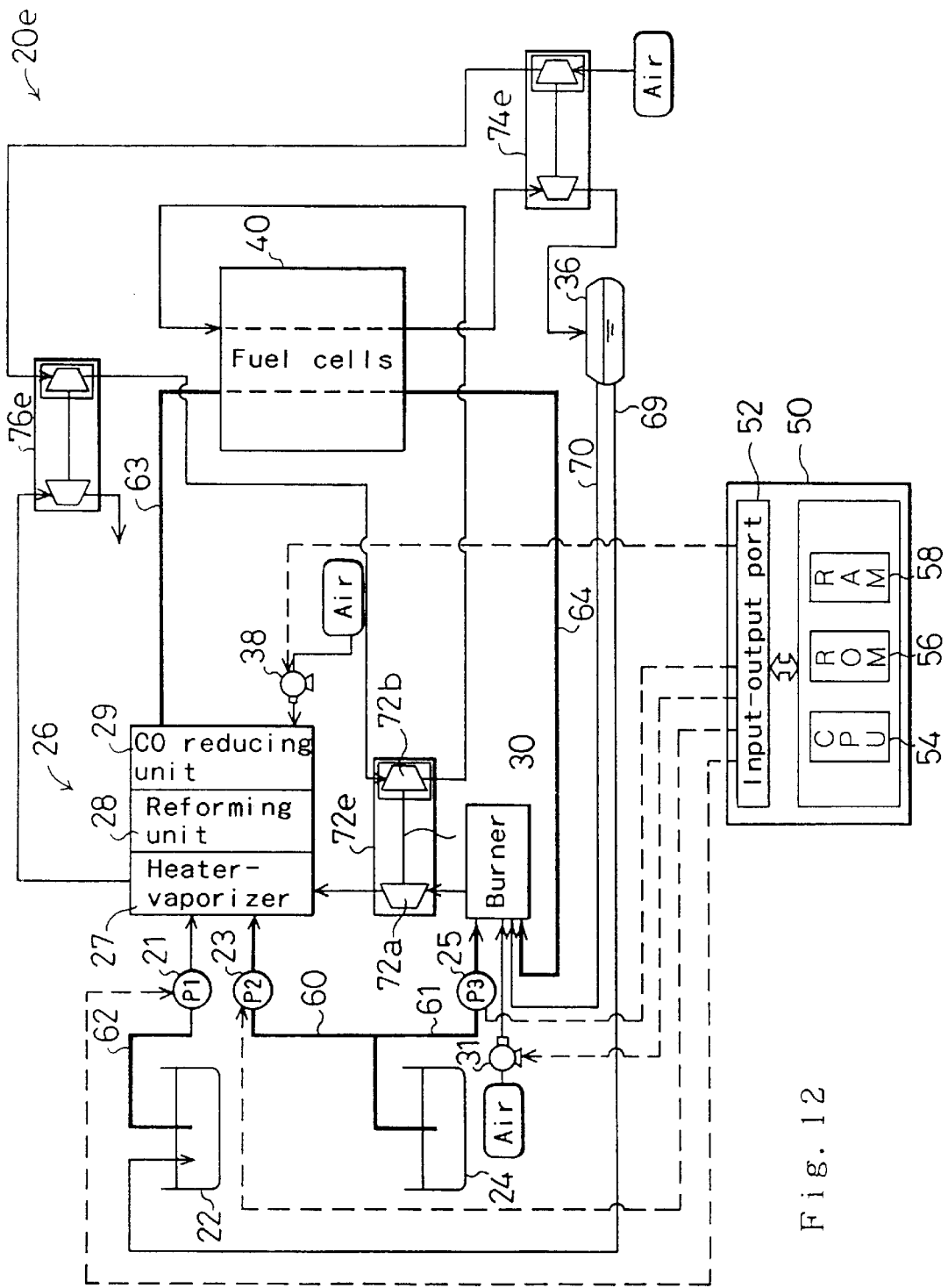
FIG. 12 is a block diagram schematically illustrating the structure of a fuel-cells system 20e.

In each of the second to fourth embodiments described in the foregoing, a compressor unit incorporating the oxygen enrichment unit is driven by high-pressure gas discharged from a prescribed member constituting the fuel-cells system. Another possible arrangement is to effect oxygen enrichment of air using multiple oxygen enrichment units in combination and to drive the multiple oxygen enrichment units using high-pressure gas discharged from multiple members constituting the fuel-cells system. A fifth embodiment of this invention configured in this manner will now be explained. FIG. 12 is a block diagram schematically illustrating the structure of a fuel-cells system 20e that is a fifth embodiment of the invention. Since the fuel-cells system 20e is configured similarly to the fuel-cells system 20 according to the first embodiment, members thereof that are the same as those of the first embodiment are assigned like reference symbols to those of the first embodiment and will not be explained again. The fuel-cells system 20e according to the fifth embodiment is equipped with compressor units 72e, 74e and 76e. Each of these compressor units internally incorporates an oxygen enrichment unit. The compressor unit 72e has the same structure as the compressor unit 72 of the second embodiment described earlier and is driven by the combustion gas supplied from the burner 30. The compressor unit 74e has the same structure as the compressor unit 74 of the third embodiment described earlier and is driven by the exhaust oxidizing gas discharged from the fuel cells 40. The compressor unit 76e has the same structure as the compressor unit 76 of the fourth embodiment described above and is driven by the combustion exhaust gas discharged from the heater-vaporizer 27. In the fuel-cells system 20e, air taken in from outside is first compressed and oxygen-enriched by the compressor unit 74e, thereafter compressed and oxygen-enriched by the compressor unit 76e, then compressed and oxygen-enriched by the compressor unit 72e and finally supplied to the fuel cells 40.

The effects that the earlier embodiments achieve by supplying oxygen-enriched, compressed air to the fuel cells as the oxidizing gas are also achieved by the fuel-cells system 20e according to the fifth embodiment. In addition, like the second to fourth embodiments, the fuel-cells system 20e also achieves a simplified configuration by incorporating the oxygen enrichment units into the compressor units. Moreover, in the fuel-cells system 20e, the multiple compressor units incorporating the oxygen enrichment units are driven by utilizing high-pressure gases discharged from multiple members constituting the fuel-cells system 20e. The provision of multiple compressor units internally incorporating oxygen enrichment units in this manner enables a further improvement in the efficiency of air compression and oxygen enrichment. It also reduces the amount of unutilized energy released from the fuel-cells system 20e, thereby enhancing effective energy utilization. Of particular note is that in this fifth embodiment the multiple compressors are connected in order from the one driven by the high-temperature gas with the least energy to the one driven by the high-pressure gas with the greatest energy. By this, the compression efficiency and the oxygen enrichment efficiency in the process of producing the oxidizing gas supplied to the fuel cells 40 can be optimized and the oxygen partial pressure of the oxidizing gas maximized.

Figure 13:
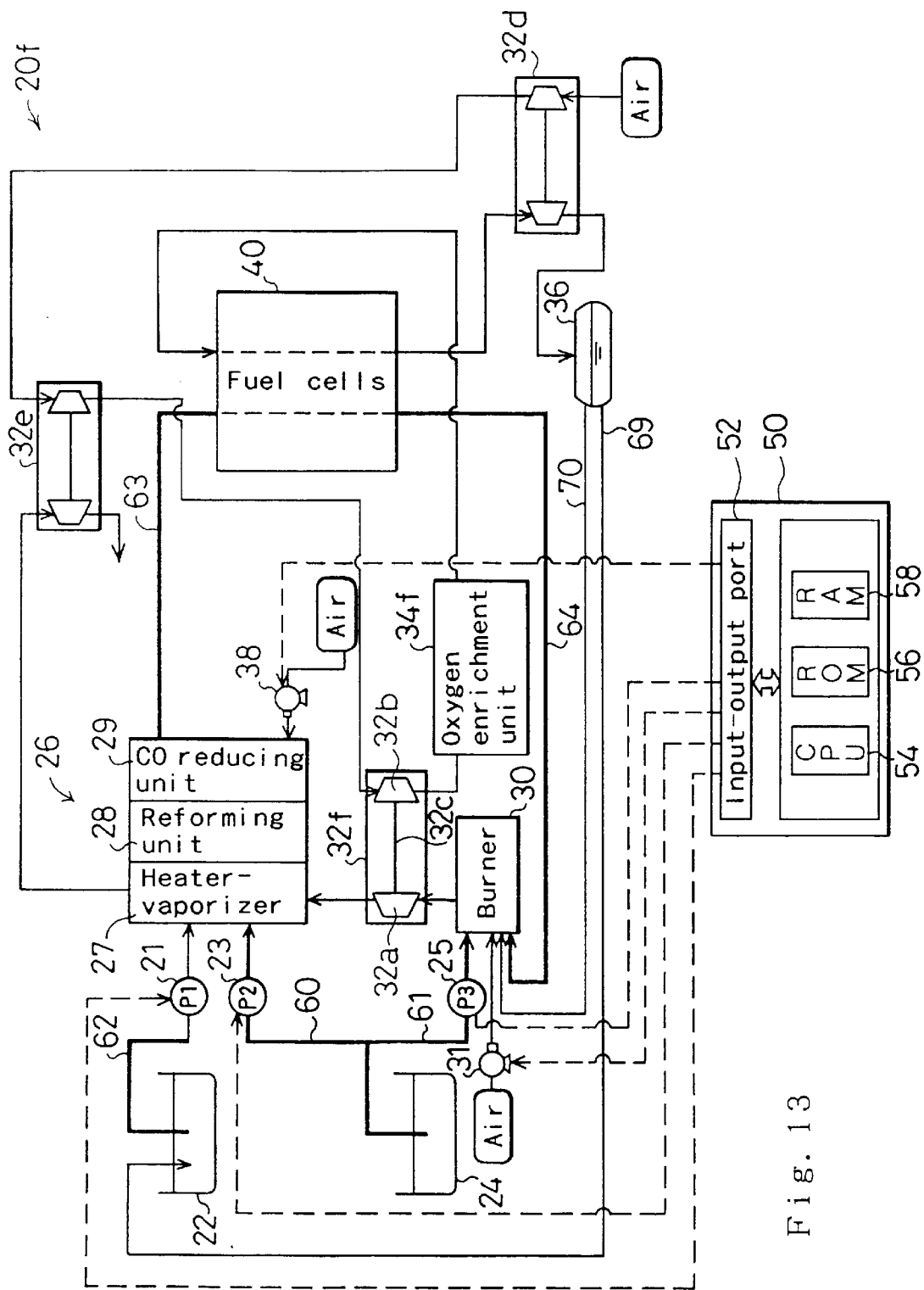
FIG. 13 is a block diagram schematically illustrating the structure of a fuel-cells system 20f.

In the fuel-cells system 20e shown in FIG. 12, it is possible to replace the compressor units 72e, 74e and 76e with compressor units that do not incorporate oxygen enrichment units and to provide a separate oxygen enrichment unit downstream of the lines connecting the compressor units. A fuel-cells system 20f configured in this manner is shown in FIG. 13. Since the fuel-cells system 20f is configured similarly to the fuel-cells system 20 according to the first embodiment, members thereof that are the same as those of the first embodiment are assigned like reference symbols to those of the first embodiment and will not be explained again. The fuel-cells system 20f is equipped with compressor units 32d, 32e and 32f and an oxygen enrichment unit 34f. The compressors units 32d, 32e and 32f have the same structure as the compressor unit 32 of the fuel-cells system 20 according to the first embodiment. The oxygen enrichment unit 34f has the same structure as the oxygen enrichment unit 34 of the fuel-cells system 20. The compressor units 32d, 32e and 32f are respectively installed at the same locations as the compressor units 74e, 76e and 72e in the fuel-cells system 20e according to the fifth embodiment. The oxygen enrichment unit 34f is provided downstream of the compressor unit 32f. Air taken in from outside is successively compressed by the compressor units 32d, 32e and 32f respectively driven by the exhaust oxidizing gas discharged from the fuel cells 40, the combustion exhaust gas discharged from the heater-vaporizer 27 and the combustion gas supplied from the burner 30. The compressed air is oxygen-enriched by the oxygen enrichment unit 34f and supplied to the fuel cells 40 as oxidizing gas.

The effects achieved by the fuel-cells system 20e according to the fifth embodiment achieves are also achieved by the fuel-cells system 20f. The fuel-cells system 20f thoroughly utilizes the high-pressure gases discharged from multiple members provided in the fuel-cells system to compress air and elevates the oxygen partial pressure of the oxidizing gas, thereby enhancing the power generating efficiency of the fuel cells 40.

In the fuel-cells system 20f just described, the oxygen enrichment unit 34f is disposed in the line for supplying oxidizing gas to the fuel cells 40 at a position downstream of the compressor units 32d, 32e and 32f. However, it is possible in a similar fuel-cells system to replace the oxygen enrichment unit 34f with an oxygen enrichment unit incorporated in one of the compressor units. For instance, the most downstream compressor unit 32f only can be replaced with a compressor unit like the compressor unit 72e provided in the fuel-cells system 20e of the fifth embodiment, i.e., with a compressor unit internally incorporating an oxygen enrichment device. With this arrangement, too, the high-pressure gases discharged from multiple members provided in the fuel-cells system can be thoroughly utilized to compress air and elevate the oxygen partial pressure of the oxidizing gas, thereby enhancing the power generating efficiency of the fuel cells 40.

In the fuel-cells system 20e and the fuel-cells system 20f according to the fifth embodiment explained in the foregoing, the multiple compressor units are connected so that the gases that drive the compressor units are, in order, the exhaust oxidizing gas discharged from the fuel cells 40, the combustion exhaust gas discharged from the heater-vaporizer 27 and the combustion gas supplied by the burner 30. This order is, however, preferably modified in light of the actual operating condition of the fuel-cells system. For example, when the energy of the exhaust oxidizing gas discharged from the fuel cells 40 is greater than that of the combustion exhaust gas discharged from the heater-vaporizer 27, the compressor unit 74e or compressor unit 32d driven by the exhaust oxidizing gas is preferably connected upstream of the compressor unit 76e or the compressor unit 32e.

In the fuel-cells system 20e and the fuel-cells system 20f explained in the foregoing, the combustion gas supplied from the burner 30, the combustion exhaust gas discharged from the heater-vaporizer 27 and the exhaust oxidizing gas discharged from the fuel cells 40 are used to compress the oxidizing gas supplied to the fuel cells 40. However, not all of these high-pressure gases need be utilized. It suffices, for example, to utilize two of these three high-temperature gases. Use can also be made of high-pressure gases discharged by other members constituting the fuel-cells system or by prescribed members constituting the electric vehicle in which the fuel-cells system is installed. In any case, the oxidizing gas can be compressed without energy waste if the high-pressure gases are used for compression in order from that having the least energy to that having the greatest energy.

The oxygen enrichment units of the fuel-cells systems according to the embodiments described in the foregoing take advantage of the fact that oxygen molecules are paramagnetic. Specifically, as explained above they utilize the migration of the oxygen molecules toward the poles to effect oxygen enrichment. Since oxygen molecules are paramagnetic, their magnetic susceptibility, a factor affecting oxygen enrichment, is defined by Curie's law:

$$\chi = C/T \quad (10)$$

$\chi$: Magnetic susceptibility of oxygen

C: Curie constant

T: Absolute temperature

From Curie's law it follows that the magnetic susceptibility of oxygen increases with decreasing absolute temperature. In other words, the farther the temperature of the air supplied to an oxygen enrichment device is lowered, the greater will be the magnetic susceptibility of the oxygen and the higher will be the oxygen enrichment yield (oxygen concentration of the oxygen-enriched air produced) in the oxygen enrichment device. A sixth embodiment of the invention will now be explained which is configured so that during the elevation of the oxygen partial pressure of an oxidizing gas by use of a magnetic oxygen enrichment device the oxygen partial pressure of the oxidizing gas is further increased by lowering the temperature of the air supplied to the oxygen enrichment device.

Figure 14:
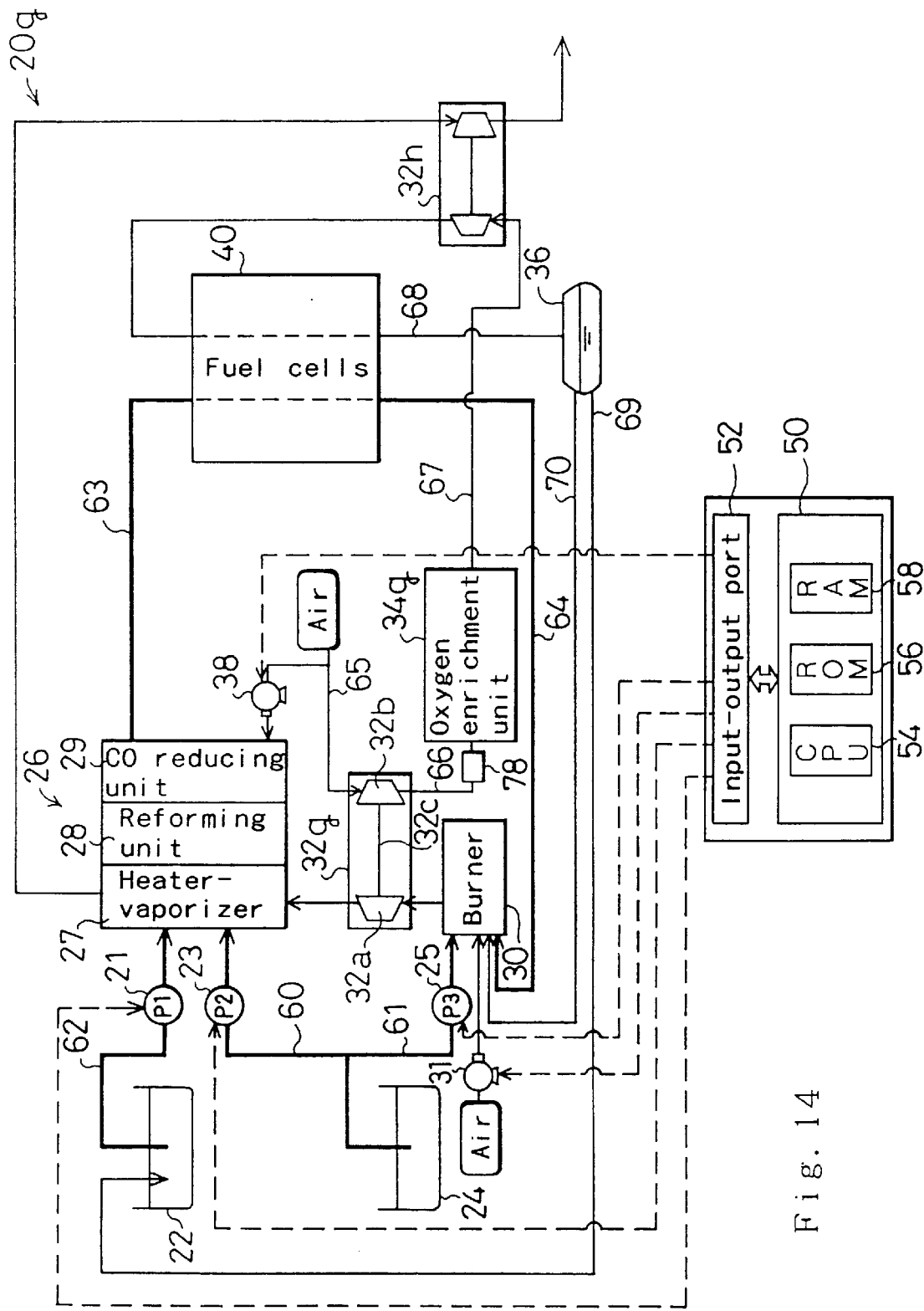
FIG. 14 is a block diagram schematically illustrating the structure of a fuel-cells system 20g.

FIG. 14 is a block diagram schematically illustrating the structure of a fuel-cells system 20g that is a sixth embodiment of the invention. Since the fuel-cells system 20g is configured similarly to the fuel-cells system 20 according to the first embodiment, members thereof that are the same as those of the first embodiment are assigned like reference symbols to those of the first embodiment and will not be explained again. The fuel-cells system 20g according to the sixth embodiment is equipped with a compressor unit 32g driven by the combustion gas supplied from the burner 30, a compressor unit 32h driven by the combustion exhaust gas discharged from the heater-vaporizer 27, a cooler 78 and an oxygen enrichment unit 34g. In the fuel-cells system 20g, air taken in from outside is first compressed by the compressor unit 32g and supplied to the cooler 78. The cooler 78 cools the compressed air and supplies the cooled compressed air to the oxygen enrichment unit 34g. The air enriched in oxygen by the oxygen enrichment unit 34g is supplied to the compressor unit 32h, compressed and supplied as oxidizing gas to the fuel cells 40. The oxygen enrichment unit 34g is configured similarly to the oxygen enrichment unit 34 of the fuel-cells system 20 according to the first embodiment. The compressor units 32g, 32h are configured similarly to the compressor unit 32 of the first embodiment.

The cooler 78 in this embodiment is a vortex cooling apparatus (Vortex Tube, product of Vortec Inc.). When supplied with compressed air, the vortex cooler can deliver cooled air without being specially supplied with energy for cooling. The compressed air compressed by the compressor unit 32g and supplied into the cooler 78 through the compressed air line 66 forms a vortex in the tube of the cooler and rotates at high speed. Part of the rapidly rotating air forming an outer vortex in the tube is discharged as warm air from a warm air vent provided at one end of the cooler 78. The remaining air forms an inner vortex to move inside the outer vortex in the opposite direction and to be vented from a cold air vent provided at the other end of the cooler 78. Since the quantity of heat supplied to the outer vortex rotating and moving along the inner wall of the tube and the quantity of heat removed from the inner vortex that moves and rotates in the reversed direction inside the outer vortex are equal to each other, the temperature of the cooled air discharged from the cold air vent can be regulated by controlling a control valve that regulates the amount of warm air discharged from the warm air vent. The cooled air discharged from the cooler 78 is oxygen-enriched by the oxygen enrichment unit 34g. The cooled air discharged by the cooler 78 and supplied to the oxygen enrichment unit 34g is at approximately atmospheric pressure. The oxygen-enriched air discharged from the oxygen enrichment unit 34g is therefore forwarded to the compressor unit 32h to be compressed before supply as oxidizing gas to the fuel cells 40.

The effects that the earlier described embodiments achieve by supplying compressed, oxygen-enriched air to the fuel cells as the oxidizing gas are also achieved by the fuel-cells system 20g according to the sixth embodiment. Moreover, since the fuel-cells system 20g is equipped to supply cooled air to the magnetic oxygen enrichment unit 34g, the oxygen enrichment yield (oxygen concentration of the oxygen-enriched air produced) in the oxygen enrichment unit 34g is enhanced. Since this embodiment uses the vortex cooler described above to cool the air supplied to the oxygen enrichment unit 34g, compressed air can be cooled simply by supplying it to the cooler 78. The provision of the cooler 78 therefore does not complicate the structure of the overall fuel-cells system. Moreover, since no special energy supply means is needed for cooling the air supplied to the oxygen enrichment unit 34g, the energy efficiency of the fuel-cells system 20g as a whole is not degraded.

The fuel-cells system 20g uses the compressor unit 32h driven by the combustion exhaust gas discharged from the heater-vaporizer 27 to increase the pressure of the oxygen-enriched oxidizing gas from the oxygen enrichment unit 34g to the prescribed pressure required for the electrochemical reactions in the fuel cells 40. As the energy source for driving this type of compressor unit, it is possible not only to use the combustion exhaust gas from the heater-vaporizer 27 utilized by the compressor unit 32h but also to use the exhaust oxidizing gas discharged from the fuel cells 40. However, use of the combustion exhaust gas discharged from the heater-vaporizer 27 as in this embodiment enables the oxidizing gas to be compressed more quickly at startup of the fuel-cells system 20g. This is because once heating of the heater-vaporizer 27 by the burner 30 begins with startup of the fuel-cells system 20g, the heater-vaporizer 27 promptly commences to discharge combustion exhaust gas that the compressor unit 32h uses to compress reformed gas for supply to the fuel cells 40.

Figure 15:
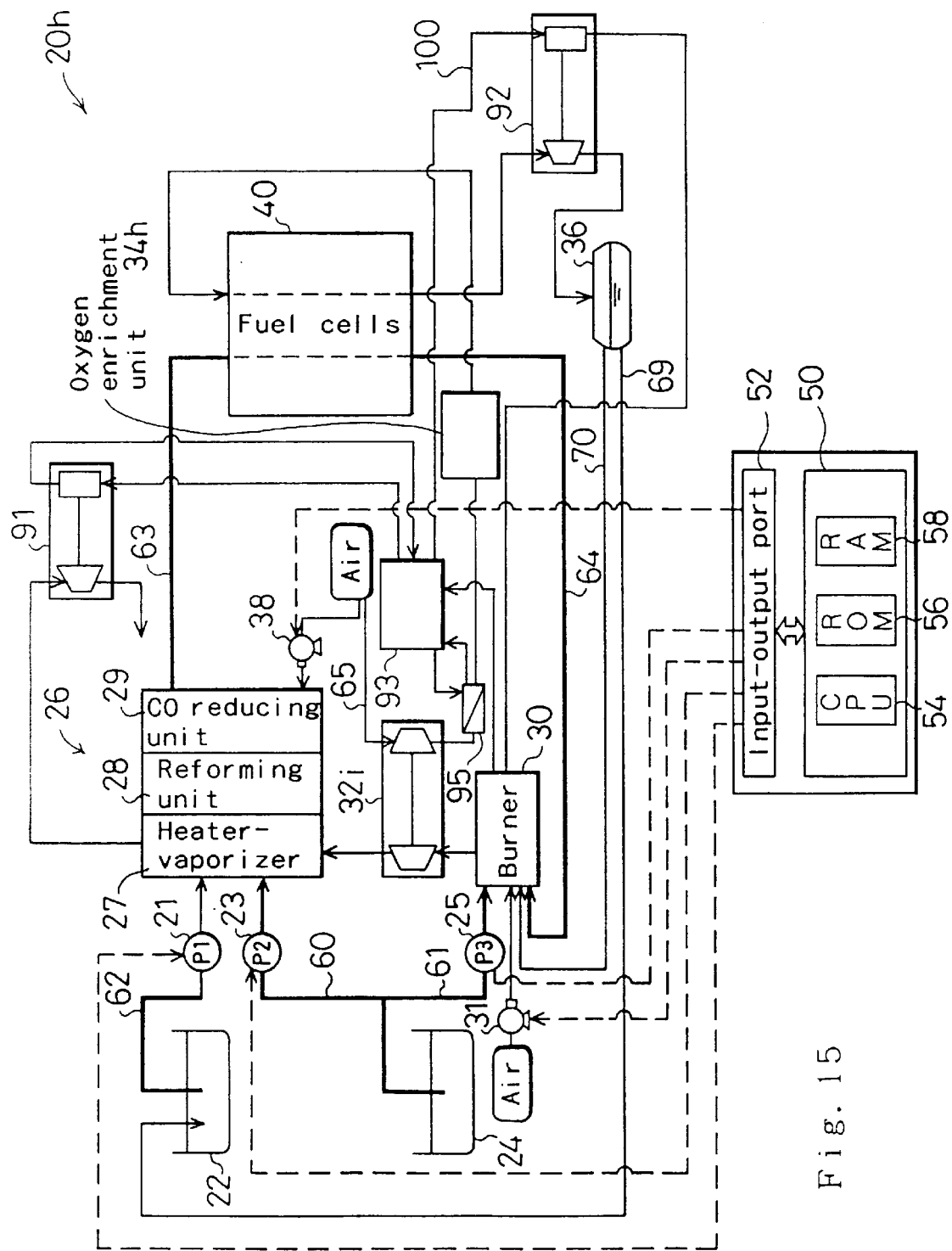
FIG. 15 is a block diagram schematically illustrating the structure of a fuel-cells system 20h.

Although the fuel-cells system 20g according to the sixth embodiment uses a vortex cooler for cooling air supplied to the oxygen enrichment unit 34g, other types of coolers can also be used. A configuration using another type of cooler will now be explained as the seventh embodiment of the invention. FIG. 15 is a block diagram schematically illustrating the structure of a fuel-cells system 20h that is a seventh embodiment of the invention. Since the fuel-cells system 20h is configured similarly to the fuel-cells system 20 according to the first embodiment, members thereof that are the same as those of the first embodiment are assigned like reference symbols to those of the first embodiment and will not be explained again. The fuel-cells system 20h according to the seventh embodiment is equipped with a compressor unit 32i driven by the combustion gas supplied from the burner 30, a coolant pump 91 driven by the combustion exhaust gas discharged from the heater-vaporizer 27, an absorbent pump 92 driven by the exhaust oxidizing gas discharged from the fuel cells 40, a low-power absorption cooler 93, a heat exchanger 95 for cooling compressed air by effecting heat exchange between the air compressed by the compressor unit 32i and the cold water cooled by the cooler 93, and an oxygen enrichment unit 34h for oxygen-enriching cooled compressed air supplied from the heat exchanger 95.

The compressor unit 32i is for compressing air taken in from outside and supplying the compressed air to the oxygen enrichment unit 34h through the heat exchanger 95. It is of the same configuration as the compressor unit 32 of the fuel-cells system 20 according to the first embodiment. The oxygen enrichment unit 34h, which is of the same configuration as the oxygen enrichment unit 34 of the fuel-cells system 20 according to the first embodiment, receives and oxygen-enriches the compressed air cooled by the heat exchanger 95 and supplies the oxygen-enriched air to the fuel cells 40 as oxidizing gas. The coolant pump 91 receives power from the combustion exhaust gas discharged from the heater-vaporizer 27 for circulation of coolant in the cooler 93. The absorbent pump 92, which obtains power from the exhaust oxidizing gas discharged by the fuel cells 40, pumps liquid absorbent from the cooler 93 and supplies it to the burner 30. The coolant pump 91 and the absorbent pump 92 are equipped with impellers rotated by the respective gases. In each pump, the power of the impeller is transferred through a shaft to effect the pumping operation. The portion of the fuel-cells system 20h shown in FIG. 15 related to cooling of compressed air is shown in detail in FIG. 16.

Figure 16:
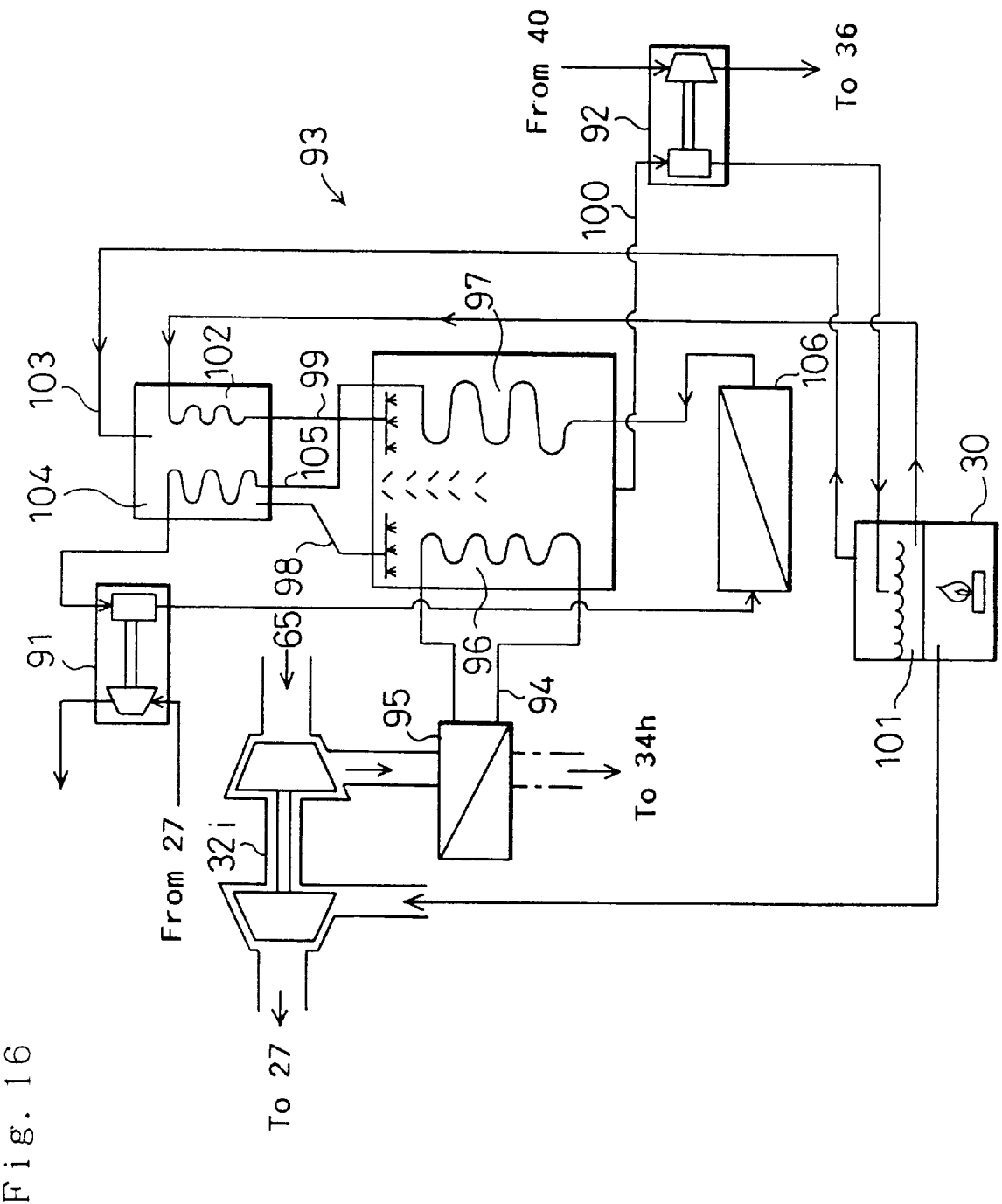
FIG. 16 is a block diagram schematically illustrating the detailed structure of the portion of the structure of the fuel-cells system 20h related to compressed air cooling.

The cooling operation effected mainly by the cooler 93 will now be explained with reference to FIG. 16. The cooler 93, an absorption cooling device, comprises an evaporator 96 and an absorber 97 integrated as a single unit. Coolant is circulated between the evaporator 96 and the heat exchanger 95 through a coolant line 94. A refrigerant (water in this embodiment) is supplied to the evaporator 96 through a refrigerant line 98. The refrigerant is dripped onto the portion of the coolant line 94 disposed inside the evaporator 96. The interior space of the evaporator 96 and the absorber 97 is vacuumized to around several mmHg. The dripped refrigerant evaporates to absorb heat of vaporization from the coolant in the coolant line 94. The coolant cooled in this manner is circulated through the coolant line 94 and used in the heat exchanger 95 to cool the compressed air supplied from the compressor unit 32i. The compressed air cooled in the heat exchanger 95 is supplied to the oxygen enrichment unit 34 for oxygen enrichment and then to the fuel cells 40 as oxidizing gas. Thus in the fuel-cells system 20 of this embodiment the operation for cooling the air supplied to the oxygen enrichment unit 34h is conducted mainly by the evaporator 96 and the heat exchanger 95 of the cooler 93. The coolant raised in temperature by heat exchange with the compressed air in the heat exchanger 95 is returned to the evaporator 96 for cooling, whereafter the foregoing operation is repeated.

In the absorber 97, which like the evaporator 96 is also vacuumized, liquid absorbent (aqueous sodium bromide solution in this embodiment) is dripped from a concentrated absorbent line 99. The dripped absorbent is diluted by absorption of steam in the absorber 97. The steam absorbed by the absorbent is that produced in the evaporator 96 when, as explained above, the refrigerant (water) is evaporated to absorb heat of vaporization from the coolant in the coolant line 94. The absorbent diluted by steam absorption is pumped out of the evaporator 96 by the absorbent pump 92 and supplied to the burner 30 through a dilute absorbent line 100.

While, as explained earlier, the burner 30 is for supplying combustion gas to the heater-vaporizer 27 via the compressor unit 32i, it is also provided inside with a high-temperature regenerator 101. The high-temperature regenerator 101 heats the dilute absorbent to concentrate it by driving out steam . The absorbent concentrated by the high-temperature regenerator 101 is sent to a low-temperature regenerator 102 where it is further concentrated. The steam driven out of the absorbent by the high-temperature regenerator 101 is forwarded to the low-temperature regenerator 102 through a steam line 103. The low-temperature regenerator 102 uses the heat of the steam for further concentration of the absorbent.

The pressure of the low-temperature regenerator 102 is set low so as to have a lower boiling point than the high-temperature regenerator 101. The steam generated in the high-temperature regenerator 101 is sent to the low-temperature regenerator 102 where its heat is used to heat and further concentrate the absorbent. The absorbent concentrated by the low-temperature regenerator 102 is again dripped into the absorber 97 through the concentrated absorbent line 99 and used to absorb the evaporated refrigerant. The steam forwarded to the low-temperature regenerator 102 through the steam line 103 falls in temperature upon being used to heat the absorbent and is then further cooled and condensed by an appropriate coolant in a condensed water recovery vessel 104 formed integrally with the low-temperature regenerator 102. The water condensed in the condensed water recovery vessel 104 is supplied through the refrigerant line 98 to the evaporator 96 and dripped as refrigerant on the cooant line 94.

The coolant used to condense steam in the condensed water recovery vessel 104 flows through a coolant line 105, which forms a closed loop connecting the condensed water recovery vessel 104, the absorber 97, a heat exchanger 106, and the coolant pump 91. The coolant in the coolant line 105 is circulated through this loop by the coolant pump 91. After being cooled in the heat exchanger 106, the coolant first goes to the absorber 97, where it removes heat produced when the refrigerant steam is absorbed by the absorbent. It then goes to the condensed water recovery vessel 104, where it cools steam and restores it to liquid refrigerant. After having its temperature raised in the absorber 97 and the condensed water recovery vessel 104, the coolant is cooled in the heat exchanger 106, whereafter the same operation is repeated.

Since the fuel-cells system 20h according to this embodiment first cools air taken in from outside and then supplies the cooled air to the oxygen enrichment unit, it can achieve the same effect as the fuel-cells system 20g according to the sixth embodiment. Moreover, in the fuel-cells system 20h according to this embodiment, the cooler 93, unlike the cooler 78 of the sixth embodiment, does not cause a large decrease in the pressure of the once compressed air during the cooling operation. Highly compressed and cooled gas can therefore be obtained by supplying compressed air to the cooler 93 and no need arises to recompress the oxygen-enriched oxidizing gas at the time of supplying it to the fuel cells. The fuel-cells system therefore has a simple configuration and is not lowered in energy efficiency owing to oxidizing gas recompression. Still, if recompression is found to produce a pronounced effect, the pressure of the oxidizing gas can be further increased by recompressing the oxidizing gas oxygen-enriched by the oxygen enrichment unit 34h.

In the fuel-cells system 20h according to the invention, the combustion exhaust gas discharged from the heater-vaporizer 27 and the exhaust oxidizing gas discharged by the fuel cells 40 are used for the circulation of the coolant and the absorbent required for the cooling operation effected in the cooler 93 that cools the oxidizing gas supplied to the oxygen enrichment unit 34h. Therefore, the overall fuel-cells system effectively utilizes energy and the amount of energy consumed to operate the cooler 93 can be reduced.

The cooler is not limited to the vortex type of the sixth embodiment or the absorption type of the seventh embodiment. Any type of cooler capable of cooling the air before it is supplied to the oxygen enrichment unit can be used to obtain the same effects. The cooler is only required to be capable of supplying sufficiently cooled oxygen to the oxygen enrichment device while staying within the allowable range of energy consumption. Depending on the type of cooler selected, the oxidizing gas can be recompressed as required before supply to the fuel cells.

All embodiments of the fuel-cells system described in the foregoing are equipped with at least one oxygen enrichment unit constituted as a magnetic oxygen enrichment device and at least one compressor unit and are configured to effect oxygen enrichment and compression of the oxidizing gas. However, when a large improvement in fuel cell performance can be achieved solely by the increase in the oxygen partial pressure achieved by the oxygen enrichment, the compression of the oxidizing gas supplied to the fuel cells can be set lower than in the described embodiments.

The fuel systems of the described embodiments are equipped with fuel cells of the solid polymer type. However, other types of fuel cells, such as phosphoric acid fuel cells, can also be applied in the fuel-cells system of this invention. Also in the case of adopting a different type of fuel cell, the performance of the fuel cells can be improved by using the magnetic oxygen enrichment device to increase the oxygen partial pressure of the oxidizing gas supplied to the anode side. If the gaseous fuel supplied to the cathode side of the different type of fuel cell adopted is generated by reforming a raw fuel such as methanol, then, as in the described embodiments, the high-pressure gas discharged by an appropriate member involved in the fuel reformation can be used to drive the magnetic oxygen enrichment device and achieve effective energy utilization.

The present invention has thus been shown and described with reference to specific embodiments. However, it should be noted that the present invention is in no way limited to the details of the described arrangements but various changes and modifications may be made without departing from the scope of the appended claims.

What is claimed is:

1. A fuel-cells system comprising a fuel cell which receives a supply of gaseous fuel containing at least hydrogen and a supply of oxidizing gas containing oxygen and generates an electromotive force through an electrochemical reaction of the gaseous fuel and the oxidizing gas,
said fuel-cells system comprising an oxidizing gas supply device for feeding the supply of oxidizing gas to said fuel cell,
said oxidizing gas supply device comprising:
a magnetic field generating unit which generates a magnetic field in a space between magnetic poles,
a gaseous mixture supply unit which feeds a supply of a gaseous mixture containing at least oxygen to said space where the magnetic field is generated by said magnetic field generating unit, and
a high oxygen-concentration gas production unit which takes a high oxygen-concentration gas from the vicinity of said magnetic poles and feeds the high oxygen-concentration gas to said fuel cell as the supply of oxidizing gas,
wherein said oxidizing gas supply device further comprises an oxidizing gas compressing unit which pressurizes the oxidizing gas fed to said fuel cell, wherein said oxidizing gas compressing unit comprises a compressor that compresses the gaseous mixture or the high oxygen-concentration gas and is operated by a turbine driven by a high-pressure gas discharged from a constituent of said fuel-cells system, and wherein said magnetic field generating unit generates a magnetic field in a space of said compressor, said gaseous mixture supply unit supplies the gaseous mixture to said space where the magnetic field is generated in said compressor, and said high oxygen-concentration gas production unit feeds the compressed high oxygen-concentration gas, which is taken out of said compressor, to said fuel cell as the supply of oxidizing gas.

2. A fuel-cells system in accordance with claim 1, wherein:
said compressor is driven to compress the gas therein by power transmitted thereto by a shaft connected to said turbine,
said magnetic poles are disposed on an axis of rotation about which said compressor rotates,
said space of said compressor, which receives the gaseous mixture, has a cross-sectional area perpendicular to said axis of rotation that is smaller at a region near at least one of said magnetic poles than at other regions, and
said high oxygen-concentration gas production unit takes the compressed high oxygen-concentration gas from said region near said magnetic pole having the small cross-sectional area.

3. A fuel-cells system comprising a fuel cell which receives a supply of gaseous fuel containing at least hydrogen and a supply of oxidizing gas containing oxygen and generates an electromotive force through an electrochemical reaction of the gaseous fuel and the oxidizing gas,
said fuel-cells system comprising an oxidizing gas supply device for feeding the supply of oxidizing gas to said fuel cell,
said oxidizing gas supply device comprising:
a magnetic field generating unit which generates a magnetic field in a space between magnetic poles,
a gaseous mixture supply unit which feeds a supply of gaseous mixture containing at least oxygen to said space where the magnetic field is generated by said magnetic field generating unit,
a varying oxygen-concentration gas separation unit which separately takes a high oxygen-concentration gas and a low oxygen-concentration gas from said space where the magnetic field is generated, out of the gaseous mixture that is fed to said space where the magnetic field is generated, and
a high oxygen-concentration gas supply unit which feeds the high oxygen-concentration gas separately taken by said varying oxygen-concentration gas separation unit as the supply of oxidizing gas to said fuel cell.

4. A fuel-cells system in accordance with claim 3, wherein said oxidizing gas supply device further comprises an oxidizing gas compressing unit which pressurizes the oxidizing gas fed to said fuel cell.

5. A fuel-cells system in accordance with claim 4, wherein said oxidizing gas compressing unit comprises a compressor that compresses the gaseous mixture or the high oxygen-concentration gas and is operated by a turbine driven by a high-pressure gas discharged from a constituent of said fuel-cells system.

6. A fuel-cells system in accordance with claim 4, wherein:

said oxidizing gas compressing unit comprises a plurality of compressors arranged to operate in sequence to compress the gaseous mixture or the high oxygen-concentration gas and connected so as to be actuated by separate turbines driven by high-pressure gases discharged from separate constituents of said fuel cells system, and said plurality of compressors are arranged to be driven in an ascending order of energy possessed by the high-pressure gases to sequentially compress the gaseous mixture or the high oxygen-concentration gas.

7. A fuel-cells system in accordance with claim 3, wherein said oxidizing gas supply device is further installed with a gaseous mixture cooling unit which cools down the gaseous mixture supplied to said space where the magnetic field is generated.

8. A fuel cells-system in accordance with claim 3, wherein said varying oxygen-concentration gas separation unit comprises:

a high oxygen-concentration gas separation unit which takes a gas that is present in a specific area in the vicinity of at least one magnetic pole, out of the gaseous mixture that is fed to said space where the magnetic field is generated, as the high oxygen-concentration gas; and a low oxygen-concentration gas separation unit which takes a gas that is present in another area far from said at least one magnetic pole, out of the gaseous mixture, as the low oxygen-concentration gas.

* * * * *